US009278660B2

(12) United States Patent
Yamada

(10) Patent No.: US 9,278,660 B2
(45) Date of Patent: Mar. 8, 2016

(54) FRONT PASSENGER SEAT AIRBAG

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 67 days.

(21) Appl. No.: 14/328,041

(22) Filed: Jul. 10, 2014

(65) Prior Publication Data

US 2015/0042081 A1  Feb. 12, 2015

(30) Foreign Application Priority Data

Aug. 9, 2013  (JP) .................................. 2013-166978

(51) Int. Cl.
*B60R 21/231* (2011.01)
*B60R 21/205* (2011.01)
B60R 21/237 (2006.01)
B60R 21/2338 (2011.01)

(52) U.S. Cl.
CPC ............ *B60R 21/205* (2013.01); *B60R 21/231* (2013.01); *B60R 21/237* (2013.01); *B60R 2021/23382* (2013.01)

(58) Field of Classification Search
CPC ........................... B60R 21/205; B60R 21/235
USPC ...................................................... 280/730.1
See application file for complete search history.

(56) References Cited

U.S. PATENT DOCUMENTS

| 7,806,431 | B2 * | 10/2010 | Yamada | ................ | B60R 21/231 |
| | | | | | 280/729 |
| 7,984,924 | B2 * | 7/2011 | Yamada | .............. | B60R 21/2338 |
| | | | | | 280/743.2 |
| 8,029,016 | B2 * | 10/2011 | Moritani | ............... | B60R 21/233 |
| | | | | | 280/730.1 |
| 8,256,798 | B2 * | 9/2012 | Yamazaki | ............. | B60R 21/231 |
| | | | | | 280/732 |
| 2009/0058050 | A1 | 3/2009 | Yamada et al. | | |
| 2015/0042081 | A1 * | 2/2015 | Yamada | ................ | B60R 21/231 |
| | | | | | 280/730.1 |

FOREIGN PATENT DOCUMENTS

JP   2009-56976 A   3/2009

* cited by examiner

*Primary Examiner* — Karen Beck
(74) *Attorney, Agent, or Firm* — Posz Law Group, PLC

(57) ABSTRACT

A front passenger seat airbag includes a support inflation portion that protrudes downwards from a portion of the airbag, which is positioned on a rear side of a gas inlet port when the airbag is completely inflated, that is in contact with a rear region of an accommodating portion of an instrument panel for accommodation of the airbag, and that is supported by the instrument panel. The support inflation portion is formed by joining together respective lower edges of support inflation configuration portions of outer left and right panels, by joining respective upper edges of the support inflation configuration portions with portions of corresponding outer circumferential edges of outer left panel and outer right panel main bodies, which are positioned in front of respective outer joining portions, and by respectively joining rear edges of the support inflation configuration portions with corresponding front lower edges of inner left and right panels.

6 Claims, 22 Drawing Sheets

Fig. 12A
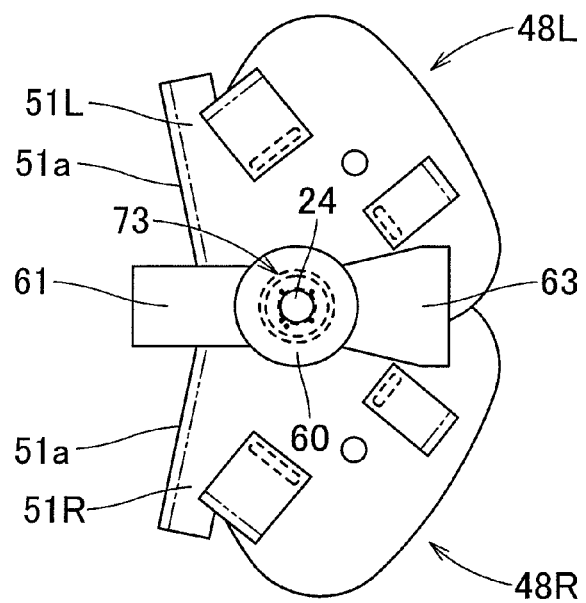
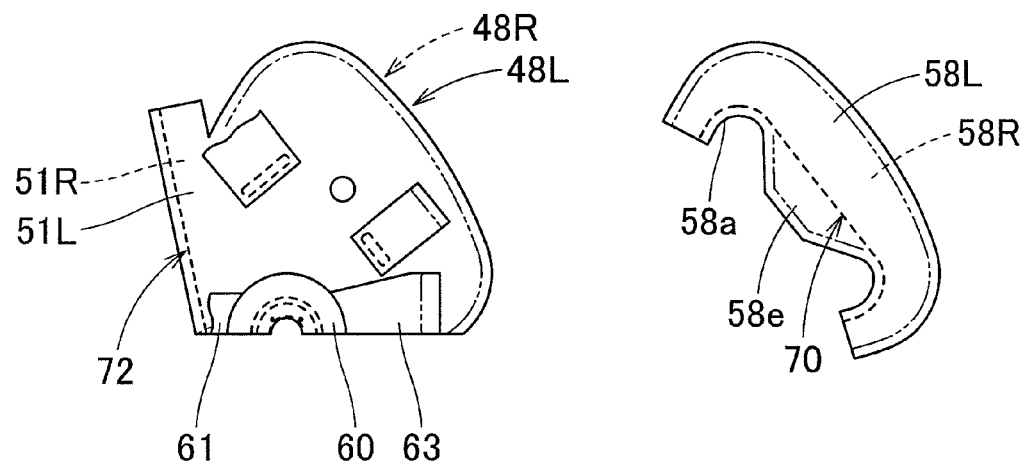
Fig. 12B the front when the airbag is completely inflated; two protrusion portions that are disposed on left and right sides of the concave portion so as to protrude to the rear; and a support inflation portion that protrudes downwards from a portion of the airbag, which is positioned on a rear side of the gas inlet port when the airbag is completely inflated, that is in contact with a region of the instrument panel, which is positioned on a rear side of the accommodating portion of the airbag, and that is supported by the instrument panel.

The airbag has a bag shape in which circumferential edges of outer left and right panels that are disposed on outer sides in a lateral direction when the airbag is completely inflated are joined with circumferential edges of inner left and right panels that are disposed on an inner side in the lateral direction when the airbag is completely inflated, respectively.

The inner left and the inner right panels are a pair of left and right panels, each of which bends so as to form a substantially C shape.

A protruding apex portion of each protrusion portions is formed of each of left and right outer joining portions that are formed by joining the outer circumferential edges of the outer left and the outer right panels with the outer circumferential edges of the inner left and the inner right panels, respectively.

A bottom portion of the concave portion is formed of an inner joining portion that is formed by joining together respective inner circumferential edges of the inner left and the inner right panels.

When each of the inner left and the inner right panels is flatly deployed in a state where a vertical direction of each of the inner left and the inner right panels coincides with a vertical direction of the completely inflated airbag, each of the inner left and the inner right panels includes a front lower edge which intersects the inner circumferential edge and the outer circumferential edge at a front lower end.

The outer left and the outer right panels include respective outer left and right panel main bodies; respective inlet port configuration portions that are positioned in front portions at lower edges of the outer left panel and the outer right panel main bodies, and form circumferential edges of the gas inlet port; and support inflation configuration portions that are respectively positioned in rear portions at the lower edges of the outer left panel and the outer right panel main bodies so as to form the support inflation portions.

The outer left and the outer right panels are substantially symmetrical with each other in at least the support inflation configuration portions.

The support inflation configuration portion has a substantially belt-like shape in which when the outer left and the outer right panels are flatly deployed in a state where a vertical direction of the support inflation configuration portion coincides with the vertical direction of the completely inflated airbag, the support inflation configuration portion is adjacent to the rear of the inlet port configuration portion, and the support inflation configuration portion is inclinedly disposed in such a manner that the support inflation configuration portion extends to the rear from the inlet port configuration portion, and a rear end of the support inflation configuration portion is separated from each of the outer left panel and the outer right panel main bodies.

The lower edge of the support inflation configuration portion and an upper edge are disposed so as to protrude downwards further than a datum line. The upper edge is separated from the outer circumferential edge of each of the outer left panel and the outer right panel main bodies at the rear end of the support inflation configuration portion. The datum line is obtained by projecting a center extension line on each of the outer left and the outer right panels which are flatly deployed.

FRONT PASSENGER SEAT AIRBAG

CROSS REFERENCE TO RELATED APPLICATIONS

The Present application claims priority from Japanese Patent Application No. 2013-166978 of Yamada, filed on Aug. 9, 2013, the disclosure of which is hereby incorporated into the present application by reference.

BACKGROUND OF THE INVENTION

1. Field of the Invention

The present invention relates to a front passenger seat airbag that is accommodated in an instrument panel in front of a front passenger seat of a vehicle.

2. Background Art

In the related art, a front passenger seat airbag is disclosed in JP-A-2009-56976. In the front passenger seat airbag of the related art, the following portions are disposed at an occupant's side when the front passenger seat airbag is completely inflated: a concave portion that is formed at a lateral center so as to be concave toward the front, and two protrusion portions that protrude to the rear relative to the concave portion on right and left sides of the concave portion. The concave portion and the protrusion portions are disposed along a vertical direction. In the front passenger seat airbag with this configuration, a circumferential portion of an accommodating portion of the instrument panel for accommodation of the airbag supports a portion of the front passenger seat airbag which is positioned in front of the protrusion portions when the front passenger seat airbag is completely inflated. The right and the left protrusion portions protruding to the rear receive the right and the left shoulders of the occupant who moves to the front. Thereafter, in a state where the right and the left shoulders are restrained by the right and the left protrusion portions, the front passenger seat airbag receives the occupant in order for the head of the occupant to enter the concave portion between the protrusion portions.

However, for example, when the instrument panel of the vehicle equipped with the front passenger seat airbag of the related art has a small exterior thickness dimension in the vertical direction, or when the instrument panel protrudes to the rear in a small distance from the accommodating portion for the accommodation of the airbag, a gap may occur between the airbag and the instrument panel when the airbag is completely inflated. For this reason, the instrument panel cannot support the airbag quickly when the airbag is completely inflated, and there is still room for improvement in ensuring a satisfactory occupant protection performance.

SUMMARY OF THE INVENTION

An object of the present invention is to provide a front passenger seat airbag which is inflatable while a gap is prevented from occurring between an instrument panel and the airbag, which can be quickly supported by the instrument panel when the airbag is completely inflated, and which can accurately protect an occupant.

The object of the present invention can be achieved by the front passenger seat airbag with the following configuration.

A front passenger seat airbag that is accommodated in an instrument panel in front of a front passenger seat of a vehicle includes a gas inlet port that is provided at substantially the lateral center of a lower surface in the vicinity of a front end when the airbag is completely inflated; a concave portion that is disposed toward an occupant so as to be concave toward to The center extension line is obtained by extending a center line that is disposed along the longitudinal direction so as to pass through an opening plane and the center of the gas inlet port at the installation of the airbag in a vehicle.

The support inflation portion is formed by joining together the respective lower edges of the support inflation configuration portions, by joining the respective upper edges of the support inflation configuration portions with portions of the corresponding outer circumferential edges of the outer left panel and the outer right panel main bodies, which are positioned in front of the respective outer joining portions, and by respectively joining the rear edges, each of which intersects the lower edge and the upper edge at the rear end of the support inflation configuration portion, with the corresponding front lower edges of the inner left and the inner right panels.

In the front passenger seat airbag according to the present invention, the support inflation portion is formed on a portion of the airbag, which is positioned on the rear side of the gas inlet port when the airbag is completely inflated, so as to protrude downwards. When the airbag is completely inflated, the support inflation portion is in contact with the region of the Instrument panel, which is positioned on the rear side of the accommodating portion, and is supported by the instrument panel. The support inflation portion is formed of the support inflation configuration portion which is formed in each of the outer left and the outer right panels of the airbag. When the airbag is completely inflated, the center joining portion is disposed at the center of the support inflation portion in the lateral direction so as to continue from the inner joining portion and to extend to the front. The center joining portion is formed by joining together the respective lower edges of the support inflation configuration portions. Each of the respective lower edges of the support inflation configuration portions of the center joining portion has the following configuration. When the outer left and the outer right panels are flatly deployed, each of the lower edges inclines to the rear and downwards from the rear side of the inlet port configuration portion. The lower edge is disposed so as to protrude downwards further than the datum line that is obtained by projecting the center extension line on the outer left and the outer right panels which are flatly deployed. The center extension line is a line obtained by extending the center line that is disposed along the longitudinal direction so as to pass through the opening plane and the center of the gas inlet port at the installation of the airbag in the vehicle. For this reason, the support inflation portion is disposed so as to incline to the rear and downwards, and to considerably protrude from the opening plane of the gas inlet port when the airbag is completely inflated. In the support inflation portion when the airbag is completely inflated, end joining portions are disposed in right and left regions on a rear side of the center joining portion. The end joining portions are formed by joining the upper edges of the support inflation configuration portions with the outer circumferential edges of the outer left and the outer right panels, respectively. The end joining portion continues from the outer joining portion. In addition, when the outer left and the outer right panels are flatly deployed, the respective upper edges of the support inflation configuration portions of the end joining portions are disposed so as to protrude downwards further than the datum line. For this reason, when the airbag is completely inflated, the support inflation portion is in wide surface contact with a region of the instrument panel in the lateral direction, which is positioned on the rear side of the accommodating portion, and the support inflation portion is disposed so as to protrude downwards further than the opening plane of the gas inlet port.

That is, in the front passenger seat airbag according to the present invention, three joining portions (the center joining portion and the two end joining portions) are disposed along a substantially longitudinal direction, and are provided in parallel with each other in the lateral direction in the considerably downwardly protruding rear region of the support inflation portion. The rear end of the center joining portion is connected to respective rear ends of the end joining portions via laterally joining portions. The laterally joining portions are formed by joining together the rear edges of the support inflation configuration portions with the front lower edges of the inner left and the inner right panels, respectively. For this reason, in the airbag according to the present invention, it is possible to stably maintain a state where the considerably downwardly protruding rear portion of the support inflation portion is in wide surface contact with the rear-side region of the instrument panel in the lateral direction using the center joining portion which is disposed at the center in the lateral direction; the end joining portions which are disposed on the right and the left sides of the center joining portion; and the laterally joining portions which are disposed so as to respectively connect the center joining portion and the end joining portions.

As a result, in the front passenger seat airbag according to the present invention includes the support inflation portion in contact with the region of the instrument panel, which is positioned on the rear side of the accommodating portion when the airbag is completely inflated, and thus it is possible to prevent occurrence of a gap between the instrument panel and the airbag.

Accordingly, in the front passenger seat airbag according to the present invention, it is possible to inflate the airbag while preventing the occurrence of the gap between the instrument panel and the airbag. The completely inflated airbag can be quickly supported by the instrument panel, and thus it is possible to accurately protect the occupant from an accident.

In the front passenger seat airbag according to the present invention, at least the respective support inflation configuration portions of the outer left and the outer right panels are substantially symmetrical with each other in the lateral direction. For this reason, it is possible to form the three-dimensional support inflation portion with partial protrusion portions using a two-dimensional joining operation, and it is possible to easily manufacture the airbag.

In the front passenger seat airbag according to the present invention, the lower edge of the support inflation configuration portion preferably includes a linear portion that is disposed on a front side and is positioned on the datum line, and a curved portion that bends to the rear and downwards from the linear portion. When the front passenger seat airbag has this configuration, for example, when reinforcement fabrics are provided on the circumferential edges of the gas inlet port, it is possible to stitch the reinforcement fabrics with a circumferential edge portion of the gas inlet port in a state where the circumferential edge portion of the gas inlet port is flatly deployed in the lateral direction from the linear stitching portion which is formed by stitching together the respective lower edges of the outer left and the outer right panels. For this reason, it is easy to stitch the reinforcement fabrics with the circumferential edge of the gas inlet port, and it is easier to manufacture the airbag compared to a case where each of the lower edges has only a single linear portion.

In the front passenger seat airbag with this configuration, the lower edge preferably includes an inclined linear portion that extends from the curved portion, and inclines with respect to the datum line. In the front passenger seat airbag with this configuration, when the airbag is completely inflated, it is possible to accurately align a portion in the vicinity of a lower end portion of the support inflation portion along the instrument panel, and thus, it is possible to further prevent the occurrence of the gap between the instrument panel and the airbag.

In the front passenger seat airbag with this configuration, the inclined linear portion is preferably set to have an incline angle of 45° or greater with respect to the datum line. In a case where the inclined linear portion is set to have an incline angle of 45° or greater with respect to the datum line, it is easy to align the support inflation portion even with the instrument panel of a different exterior shape when the airbag is completely inflated, and it is possible to install the airbag in instrument panels of different shapes in various vehicles without a design change of the airbag.

In the front passenger seat airbag with this configuration, the airbag further preferably includes a front support inflation portion that protrudes downwards from a portion of the airbag, which is positioned on a front side of the gas inlet port when the airbag is completely inflated, that is in contact with a region of the instrument panel, which is positioned on a front side of the accommodating portion, and that is supported by the instrument panel.

Each of the inner left and the inner right panels preferably includes a front upper edge that intersects the inner circumferential edge and the outer circumferential edge at a front upper edge of each of the inner left and the inner right panels which are flatly deployed.

The outer left and the outer right panels preferably include respective front support inflation configuration portions that are disposed adjacent to the front side of the gas inlet port configuration portions, that are substantially symmetrical with each other, and that form the front support inflation portions.

Each of the front support inflation configuration portions preferably has a substantially belt-like shape in which the front support inflation configuration portions are substantially symmetrical in the longitudinal direction with each other with the respective support inflation configuration portions of the rear support inflation portions and the gas inlet port as the center, the front support inflation configuration portions extend to the front from the respective gas inlet port configuration portions, and front ends of the front support inflation configuration portions are respectively separated from the outer left panel and the outer right panel main bodies.

A lower edge of the front support inflation configuration portion and an upper edge, which is separated from the outer circumferential edge of each of the outer left panel and the outer right panel main bodies at the front end of the front support inflation configuration portion, are preferably disposed so as to protrude downwards further than the datum line.

The front support inflation portion is preferably formed by joining together the respective lower edges of the front support inflation configuration portions, by joining the respective upper edges of the front support inflation configuration portions with portions of the corresponding outer circumferential edges of the outer left panel and the outer right panel main bodies, which are positioned in front of the respective outer joining portions, and by respectively joining front edges, each of which intersects the lower edge and the upper edge at the front end of the front support inflation configuration portion, with the corresponding front upper edges of the inner left and the inner right panels.

In the front passenger seat airbag with this configuration, the front support inflation portion and the rear support inflation portion can support the completely inflated airbag on the front and the rear sides of the accommodating portion. The front support inflation portion is also in wide surface contact with a front region of the instrument panel in the lateral direction. For this reason, the instrument panel can more stably support the airbag when the airbag is completely inflated.

In the front passenger seat airbag with this configuration, it is preferable that the airbag further include a longitudinal tether therein, which connects the bottom portion of the concave portion and the circumferential edge portion of the gas inlet port, and pulls the bottom portion of the concave portion to the front when the airbag is completely inflated so that the longitudinal tether regulates the shape of the completely inflated airbag. In the front passenger seat airbag with this configuration, at an initial stage of the inflation of the airbag, it is possible to prevent a portion in the vicinity of the bottom portion of the concave portion from considerably protruding to the rear, and it is possible to prevent the inflating airbag from considerably oscillating in the longitudinal direction. It is possible to quickly dispose the support inflation portion along the instrument panel.

BRIEF DESCRIPTION OF THE DRAWINGS

FIGS. 11A, 11B, 12A, 12B, 13A, 13B and 13C are schematic views illustrating a process of manufacturing the airbag of the first embodiment.

DETAILED DESCRIPTION OF THE INVENTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
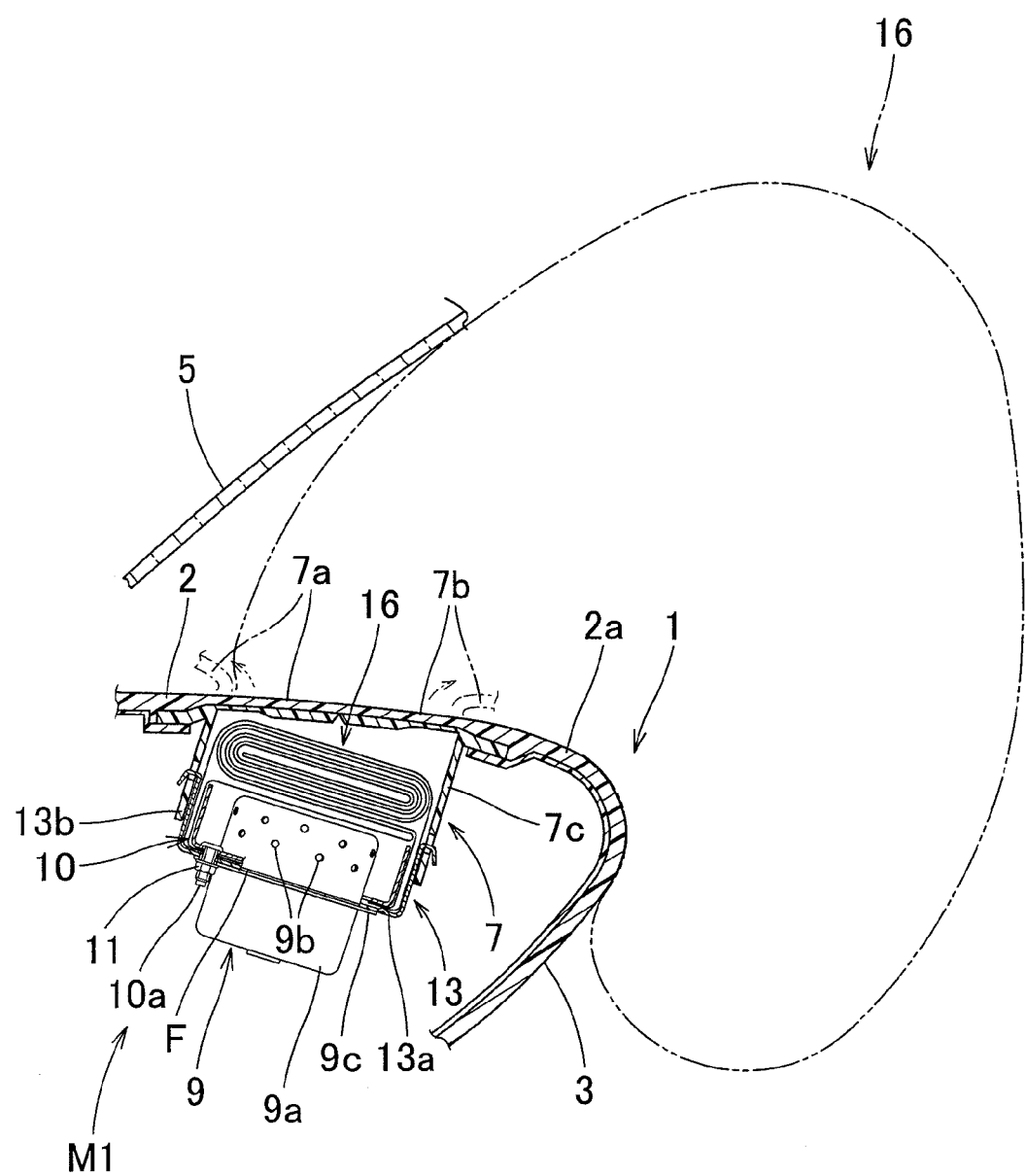
FIG. 1 is a longitudinal cross-sectional view illustrating a state a front passenger seat airbag apparatus including a front passenger seat airbag according to a first embodiment of the present invention is installed in a vehicle.

Hereinafter, an embodiment of the present invention will be described with reference to the drawings. First, a front passenger seat airbag (hereinafter, referred to as an "airbag") 16 of a first embodiment will be described. As illustrated in FIG. 1, the airbag 16 of the first embodiment is used in a front passenger seat airbag apparatus (hereinafter, referred to as an "airbag apparatus") M1 that is disposed on an inner side in the vicinity of a rear end 2a of an upper surface 2 of an instrument panel 1. As illustrated in FIG. 1, the airbag apparatus M1 includes the folded airbag 16; an inflator 9; a case 13 as an accommodating portion; a retainer 10; and an airbag cover 7 that covers the folded airbag 16. The inflator 9 supplies inflation gas into the airbag 16. The case 13 accommodates and retains the airbag 16 and the inflator 9. The retainer 10 is a member for attachment of the airbag 16 and the inflator 9 to the case 13.

The airbag apparatus M1 of the embodiment is installed in the slim instrument panel 1. In the slim instrument panel 1, a lower side of a rear surface 3 considerably bends toward the front, and thus a thickness dimension in a vertical direction is set to be small.

The airbag cover 7 is integrally formed with the synthetic resin-made instrument panel 1. The airbag cover 7 includes two front and rear door portions 7a and 7b that are pushed and opened by the airbag 16 when the airbag 16 is deployed and inflated (refer to FIG. 18). A connecting wall portion 7c surrounds the door portions 7a and 7b of the airbag cover 7 and to connect to the case 13.

The inflator 9 includes a substantially columnar main body portion 9a, and a flange portion 9c. A plurality of gas discharge ports 9b are formed in the main body portion 9a. The flange portion 9c is a portion for attachment of the inflator 9 to the case 13.

The case 13 as the accommodating portion is made of a metal plate. The case 13 has a substantially rectangular parallelepiped shape, and a substantially rectangular opening on an upper side thereof. The case 13 includes a substantially rectangular plate-shaped bottom wall portion 13a, and a circumferential wall portion 13b for locking of the connecting wall portion 7c of the airbag cover 7. The inflator 9 is inserted from below the bottom wall portion 13a and is attached to the bottom wall portion 13a. The circumferential wall portion 13b extends upwards from an outer circumferential edge of the bottom wall portion 13a. Bolts 10a of the retainer 10 disposed in the airbag 16 pass through a circumferential edge portion 25 of a gas inlet port 24 of the airbag 16, the bottom wall portion 13a of the case 13 and the flange portion 9c of the inflator 9, and each bolt 10a is fastened by a nut 11, whereby the airbag 16 and the inflator 9 are attached to the bottom wall portion 13a of the case 13. A bracket which is not illustrated is provided on the bottom wall portion 13a of the case 13 so as to connect the case 13 to a body of a vehicle.

In the embodiment, as illustrated in FIGS. 2 to 5, the airbag 16 includes a bag main body 17, and a longitudinal tether 37 and a lateral tether 44 which are disposed inside the bag main body 17, and regulate the shape of the bag main body 17 when the bag main body 17 is completely inflated.

Figure 2:
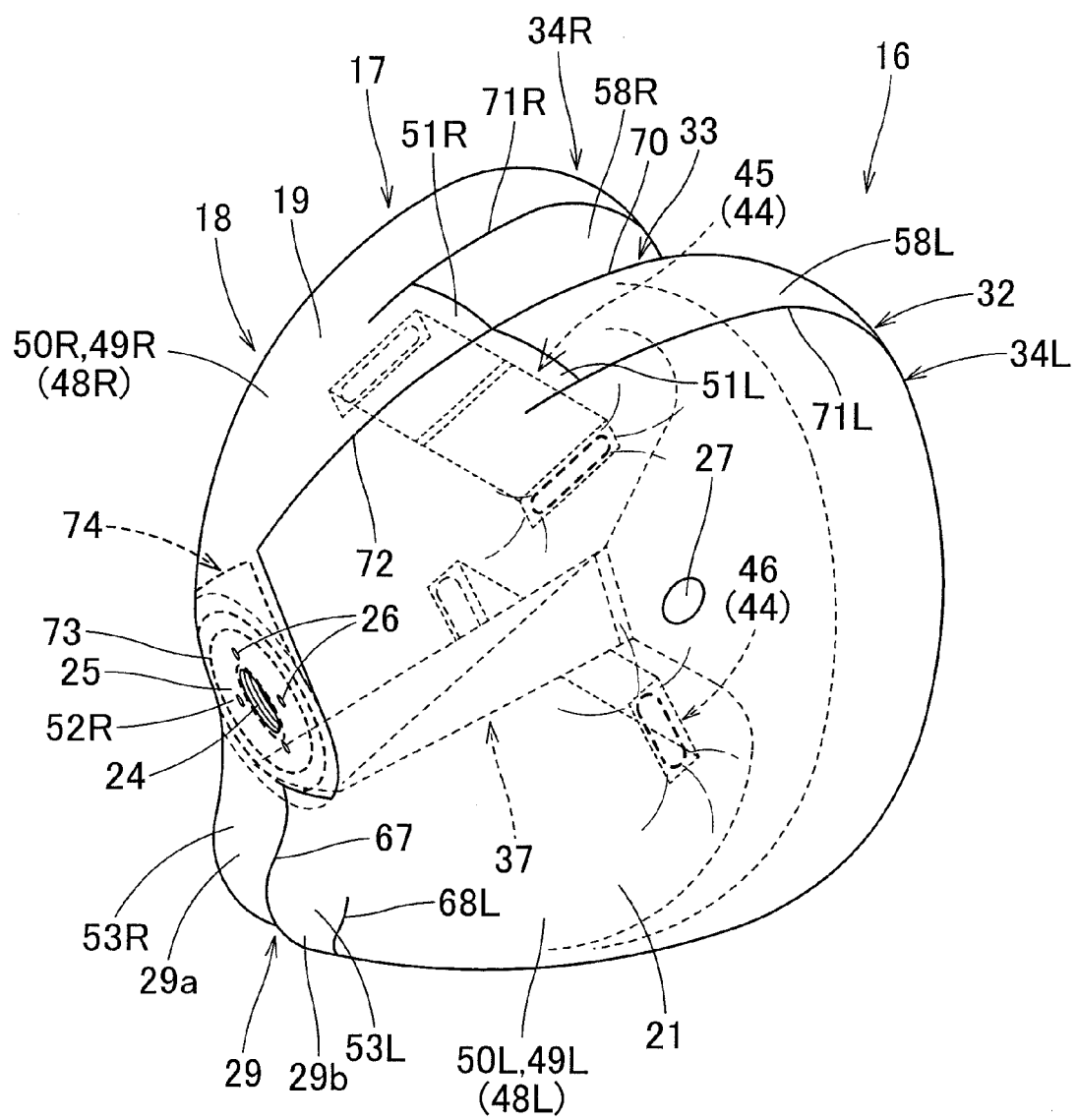
FIG. 2 is a perspective view illustrating a state where the airbag of the first embodiment is inflated solely.
Figure 3:
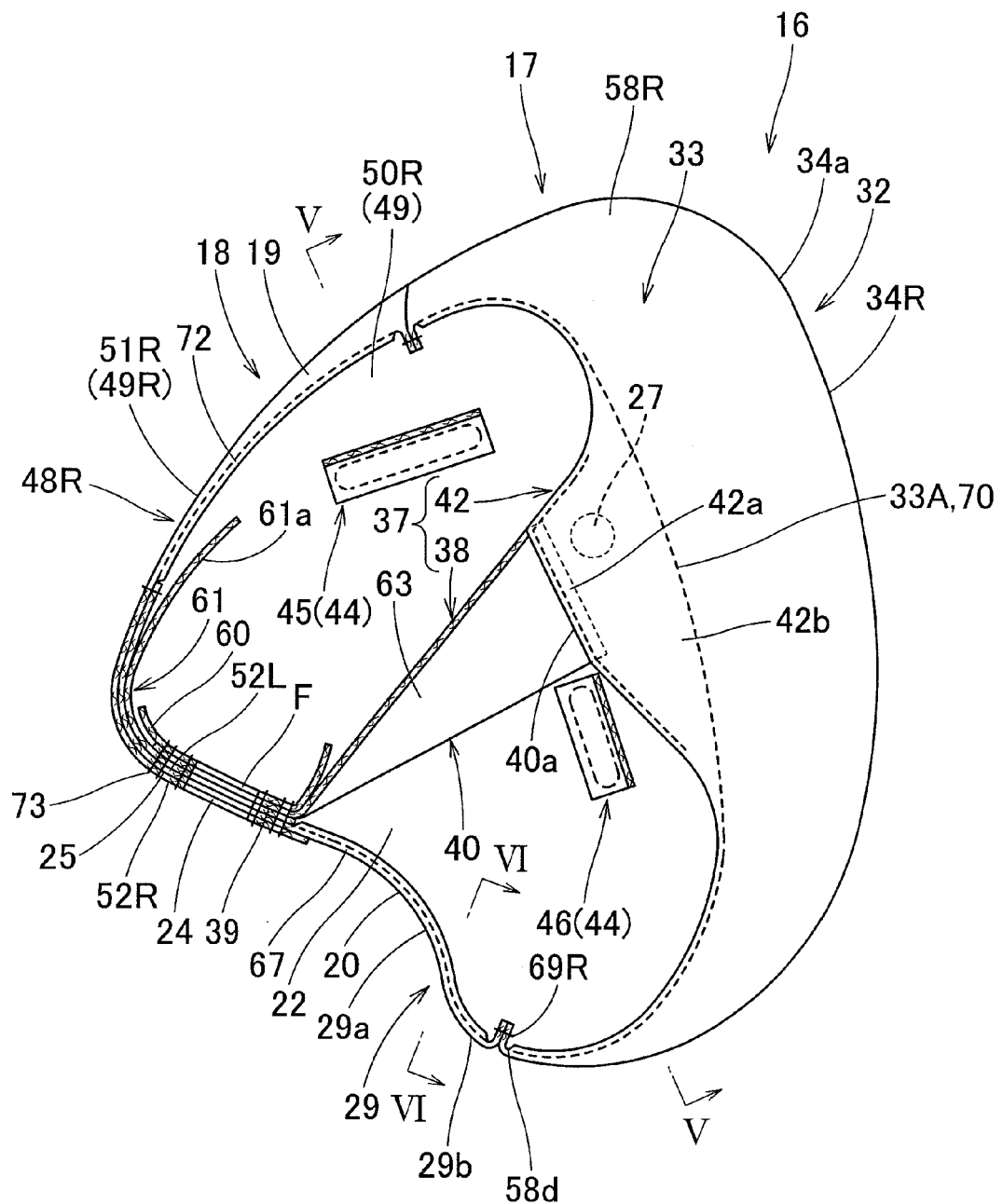
FIG. 3 is a schematic longitudinal cross-sectional view of the airbag in FIG. 2 along a longitudinal direction.
Figure 4:
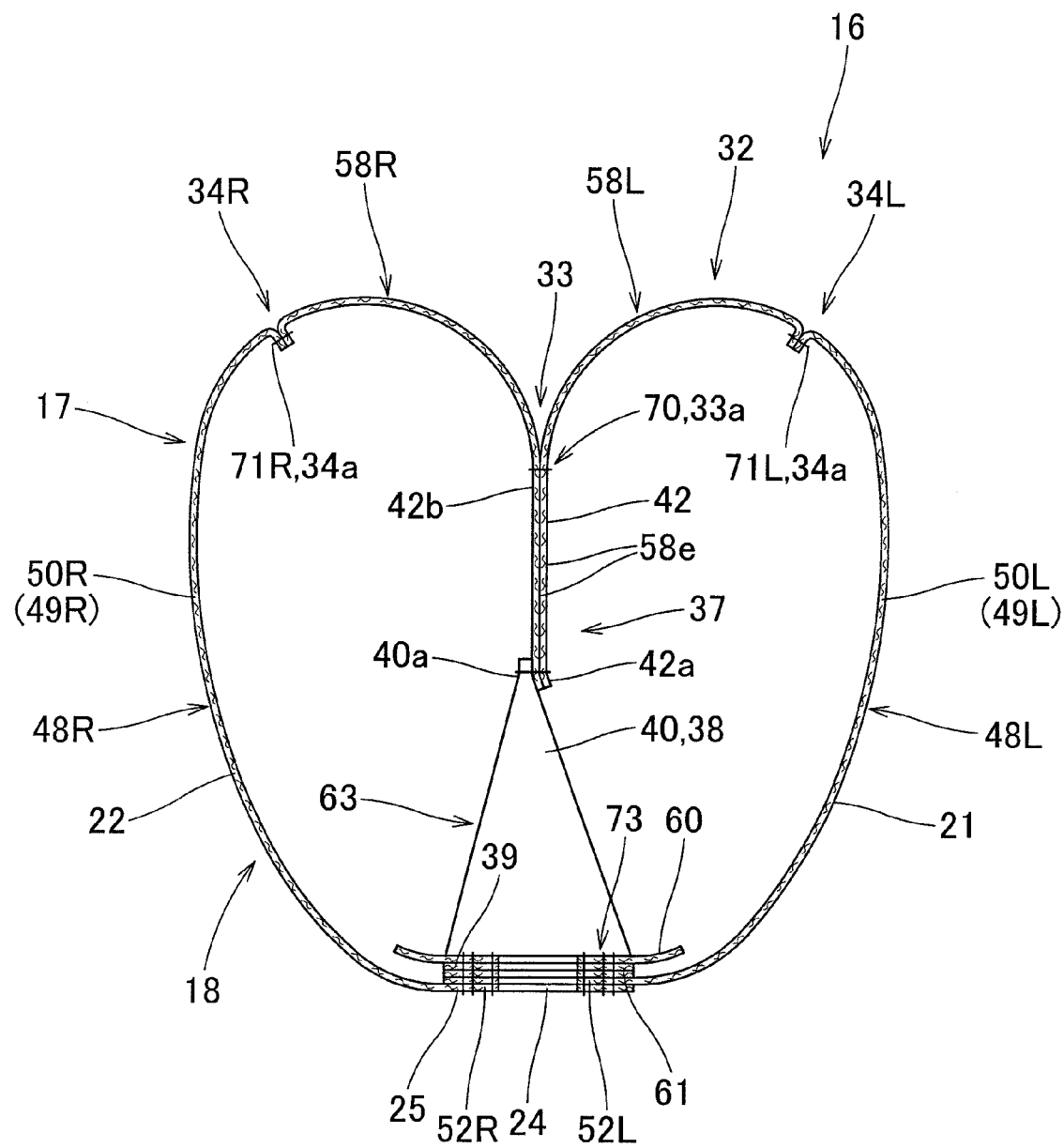
FIG. 4 is a schematic lateral cross-sectional view of the airbag in FIG. 2 along a longitudinal direction.
Figure 18:
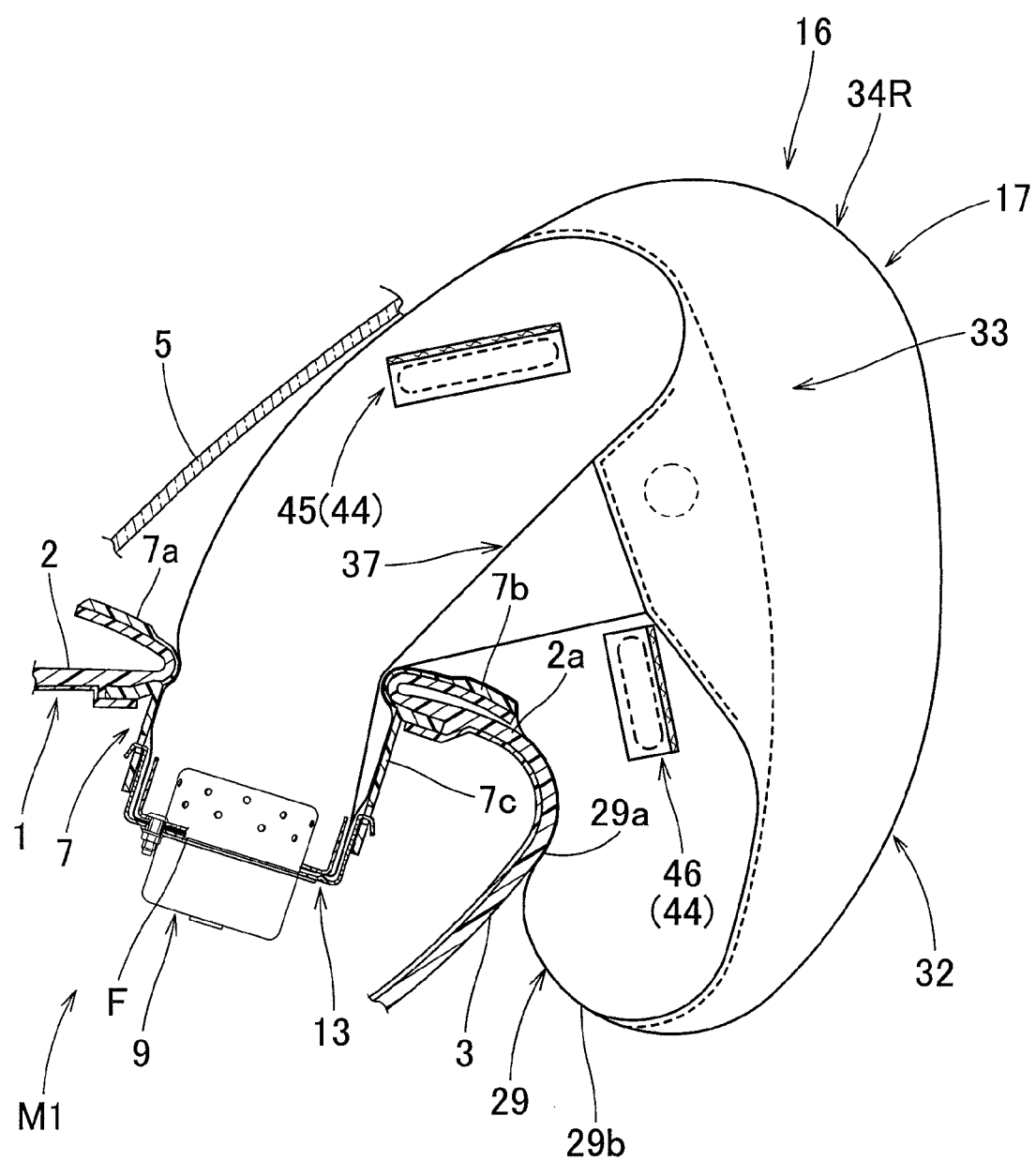
FIG. 18 is a schematic longitudinal cross-sectional view in the longitudinal direction illustrating a state where the airbag of the first embodiment is completely inflated in the front passenger seat airbag apparatus with the airbag.

The bag main body 17 has a substantially bag shape, and when inflation gas flows into the bag main body 17, the bag main body 17 inflates. In the embodiment, as illustrated by the two-dot chain line in FIG. 1 and as illustrated in FIG. 18, when the airbag 16 is completely inflated, the bag main body 17 is disposed so as to fill up a space between the upper surface 2 of the instrument panel 1 and a windshield 5 above the instrument panel 1 and to cover the rear surface 3 of the instrument panel 1. Specifically, in the embodiment, as illustrated in FIGS. 2 and 3, the bag main body 17 has a substantially quadrangular pyramidal shape in which an apex portion of the bag main body 17 is disposed at a front end when the airbag is completely inflated. The bag main body 17 includes an occupant-side wall portion 32 which is positioned toward an occupant when the airbag is completely inflated, and a circumferential wall portion 18 that extends to the front from a circumferential edge of the occupant-side wall portion 32. The circumferential wall portion 18 has a tapered shape such that the circumferential wall portion 16 converges toward the front end.

When the airbag 16 is completely inflated, the circumferential wall portion 18 of the airbag 16 is disposed so as to mainly fill up the space between the upper surface 2 of the instrument panel 1 and the windshield 5 above the instrument panel 1, and to cover the rear surface 3 of the instrument panel 1. The circumferential wall portion 18 includes an upper wall portion 19 and a lower wall portion 20 which are respectively disposed on upper and lower sides, and a left wall portion 21 and a right wall portion 22 which are respectively disposed on left and right sides. The gas inlet port 24 is formed in the vicinity of a front end of the lower wall portion 20 of the circumferential wall portion 18, and the vicinity of the front end is equivalent to the vicinity of the front end of the bag main body 17 when the airbag is completely inflated. Inflation gas can flow into the bag main body 17 via the gas inlet port 24. The gas inlet port 24 has a substantially circular opening shaped. The gas inlet port 24 is positioned at substantially the center of the lower wall portion 20 in a lateral direction. A plurality of (four in the embodiment) attachment holes 26 are formed in a circumferential edge portion 25 of the gas inlet port 24 in the lower wall portion 20. Each attachment hole 26 allows the bolt 10a of the retainer 10 to be inserted thereinto, and to attach the circumferential edge portion 25 of the gas inlet port 24 to the bottom wall portion 13a of the case 13. In the embodiment, in a state where the airbag 16 is attached to the case 13 along with the inflator 9, an opening plane F of the gas inlet port 24 slightly inclines with respect to the horizontal plane. Specifically, the opening plane F is disposed at an incline angle of approximately 10° in such a manner that a front side of the opening plane F is present at an upper position and a rear side thereof is present at a lower position (refer to FIGS. 1 and 18). A vent hole 27 is formed in each of the left wall portion 21 and the right wall portion 22 of the circumferential wall portion 18 so as to have a substantially circular-shaped opening. The vent hole 27 is intended for ventilation of the surplus of inflation gas flowing into the bag main body 17.

Figure 6:
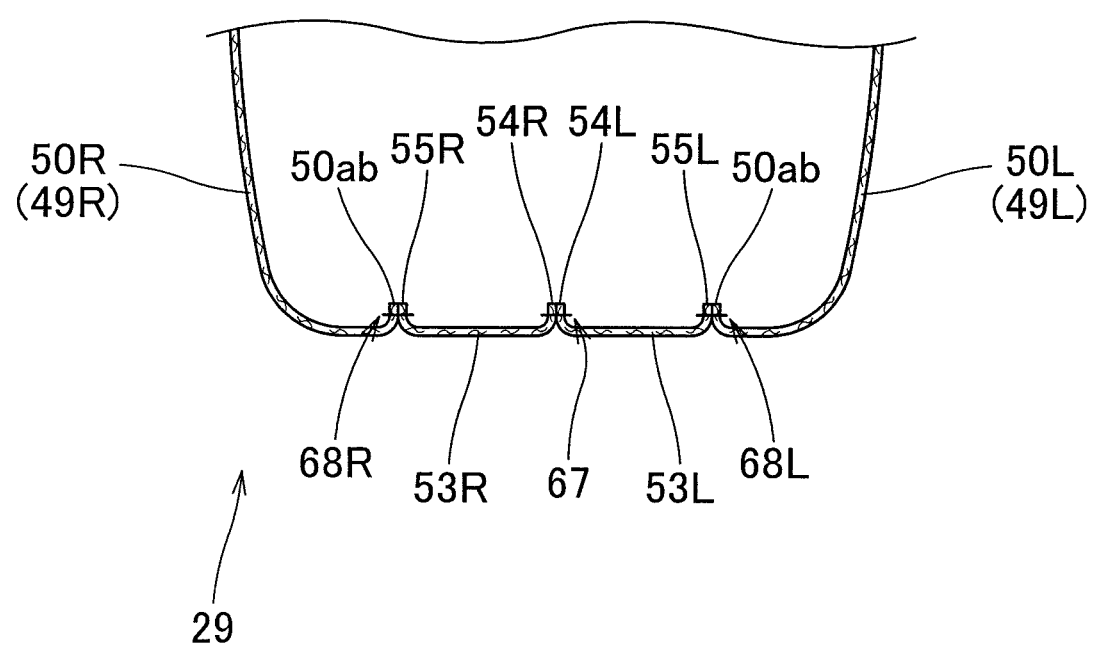
FIG. 6 is a schematic cross-sectional view of the airbag taken along line VI-VI in FIG. 3.
Figure 7:
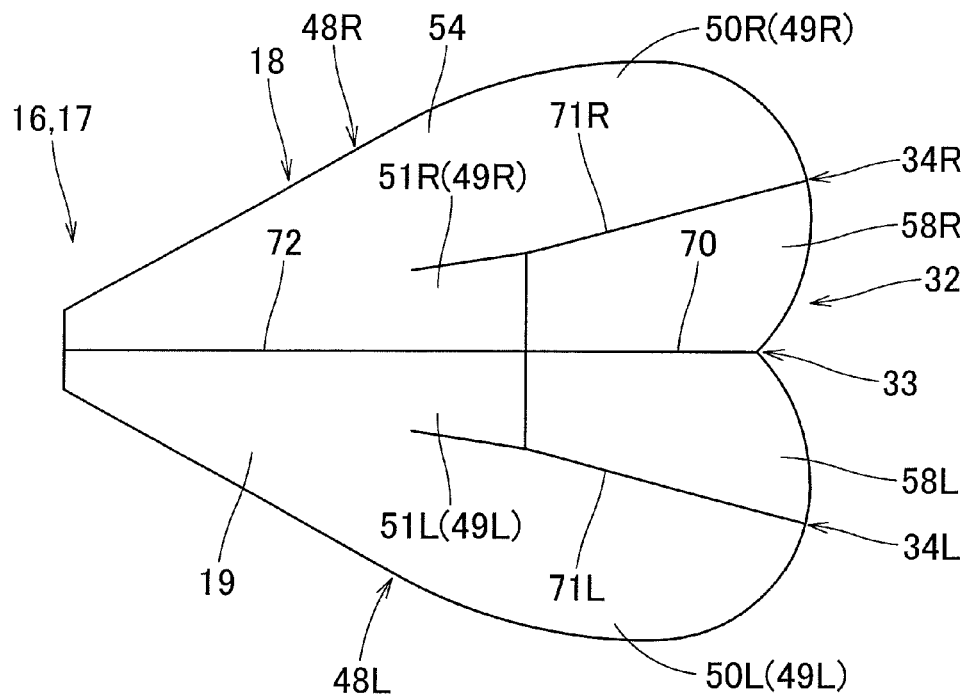
FIG. 7 is a plan view of the airbag in FIG. 2.

A support inflation portion 29 is formed in a portion of the lower wall portion 20 of the circumferential wall portion 18, which is positioned on a rear side of the gas inlet port 24 (refer to FIGS. 2, 3, and 6). The support inflation portion 29 protrudes downwards when the airbag 16 is completely inflated. The support inflation portion 29 is in contact with the rear surface 3 of the instrument panel 1, which is positioned on a rear side of the case 13, and is supported by the rear surface 3 of the instrument panel 1. Specifically, as illustrated in FIG. 18, when the airbag 16 is installed in the vehicle, a front surface 29*a* of the support inflation portion 29 is in contact with substantially the entire rear surface 3 of the instrument panel 1. The support inflation portion 29 bends in such a manner that a front surface 29*a* of the support inflation portion 29 is aligned with the rear surface 3 of the instrument panel 1, and a lower end 29*b* of the support inflation portion 29 slightly faces the front. As illustrated in FIG. 6, a lower surface of the support inflation portion 29 has a flat shape along the lateral direction. In the embodiment, the support inflation portion 29 is set to have a lateral width dimension which is approximately one third of a lateral width dimension of the bag main body 17 when the airbag is completely inflated. A center stitching portion (a center joining portion) 67 and end stitching portions (end joining portions) 68L and 68R are formed in the support inflation portion 29 (refer to FIGS. 2, 3, 6, and 8). The center stitching portion 67 is formed by joining (stitching) together respective lower edges 54L and 54R of support inflation configuration portions 53L and 53R that are respectively formed in an outer left panel 48L and an outer right panel 48R which are two sheets of panels of the circumferential wall portion 18. The end stitching portions 68L and 68R are formed by joining (stitching) upper edges 55L and 55R of the support inflation configuration portions 53L and 53R with front lower end portions 50*ab* of an outer left panel main body 49L and an outer right panel main body 49R, respectively, in an outer circumferential edge 50*a*. The center stitching portion 67 continues from a lower end of an inner stitching portion 70, and extends to the front. The inner stitching portion 70 forms a concave bottom portion (a front end 33*a*) of a concave portion 33 that is disposed at the center of the occupant-side wall portion 32 in the lateral direction.

Figure 8:
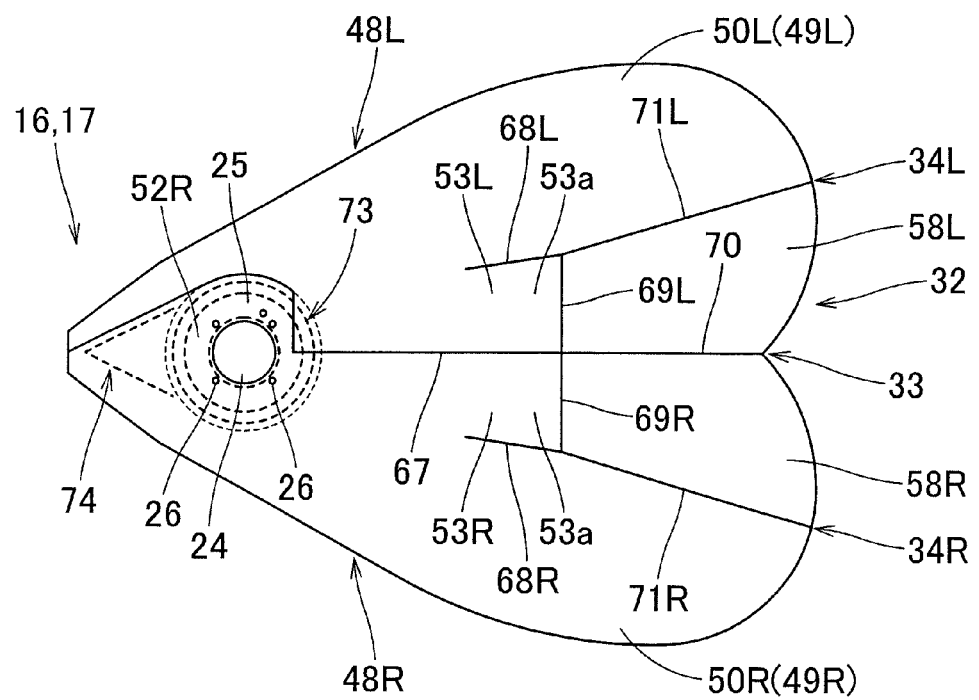
FIG. 8 is a bottom view of the airbag in FIG. 2.

The center stitching portion 67 is disposed at substantially the center of the support inflation portion 29 in the lateral direction. The center stitching portion 67 is formed to the vicinity of the gas inlet port 24 over the entire support inflation portion 29 in a substantially longitudinal direction (refer to FIG. 8). A double circular circumferential edge stitching portion 73 is formed in the circumferential edge portion 25 of the gas inlet port 24. As illustrated in FIG. 8, the center stitching portion 67 extends inwardly across the circumferential edge stitching portion 73 slightly further than the circumferential edge stitching portion 73. In the embodiment, as illustrated in FIG. 8, the end stitching portions 68L and 68R are substantially in parallel with the center stitching portion 67. The end stitching portions 68L and 68R continue from lower ends of outer stitching portions 71L and 71R, respectively, and extend to the front. The outer stitching portions 71L and 71R form protruding apex portions 34*a* of protrusion portions 34L and 34R of the occupant-side wall portion 32, respectively.

The end stitching portions 68L and 68R are respectively formed in left and right regions in a rear end of the center stitching portion 67. Lateral stitching portions (laterally joining portions) 69L and 69R are disposed in the rear end of the support inflation portion 29 along a substantially lateral direction. The lateral stitching portions 69L and 69R are disposed so as to connect a rear end of the center stitching portion 67 and respective rear ends of the end stitching portions 68L and 68R. The lateral stitching portions 69L and 69R are formed by stitching rear edges 56L and 56R of the support inflation configuration portions 53L and 53R with front lower edges 58*d* of the inner left panel 58L and the inner right panel 58R, respectively.

The occupant-side wall portion 32 is disposed so as to face the occupant sitting on a front passenger seat when the bag main body 17 is completely inflated. The occupant-side wall portion 32 is provided along a substantially vertical direction in a rear end of the bag main body 17, which is positioned to face the occupant. The concave portion 33 is provided in the occupant-side wall portion 32 so as to be concave toward the front when the bag main body 17 is completely inflated. The concave portion 33 is formed along a substantially vertical direction at substantially the center position in the lateral direction when the bag main body 17 is completely inflated (refer to FIGS. 2 to 4, 7 and 8). In the embodiment, the concave portion 33 is provided in substantially the entire vertical region of the occupant-side wall portion 32. The protrusion portions 34L and 34R are respectively provided on left and right sides of the concave portion 33 of the occupant-side wall portion 32 so as to protrude to the rear relative to the concave portion 33. That is, in the bag main body 17 of the embodiment, the concave portion 33 is continuously provided at the center of the occupant-side wall portion 32 in the lateral direction so as to be concave along the vertical direction when the bag main body 17 is completely inflated (refer to FIG. 3). In addition, the protrusion portions 34L and 34R disposed on the right and the left sides of the concave portion 33 are continuously provided along the vertical direction when the bag main body 17 is completely inflated (refer to FIG. 3). Specifically, in the embodiment, as the left protrusion portion 34L and the right protrusion portion 34R bulge in substantially the entire vertical region of the occupant-side wall portion 32, the concave portion 33 is concave in substantially the entire vertical region of the occupant-side wall portion 32. The convex shape on an upper side of each of the protrusion portions 34L and 34R converges toward the front in the upper wall portion 19 of the circumferential wall portion 18. In addition, the concave shape on an upper side of the concave portion 33 converges toward the front in the upper wall portion 19 of the circumferential wall portion 18. The convex shape on a lower side of each of the protrusion portions 34L and 34R converges toward the support inflation portion 29 formed in the lower wall portion 20. In addition, the convex shape on a lower side of the concave portion 33 converges toward the support inflation portion 29 formed in the lower wall portion 20. In the bag main body 17 of the embodiment, the concave bottom portion (the front end 33*a*) of the concave portion 33 is formed of the inner stitching portion (an inner joining portion) 70. The inner stitching portion 70 is formed by stitching (joining) respective inner circumferential edges 58*a* of the inner left panel 58L and the inner right panel 58R of the occupant-side wall portion 32 with each other, which will be described later. The protruding apex portions 34*a* of the protrusion portions 34L and 34R are respectively formed of the outer stitching portions (outer joining portions) 71L and 71R. The outer stitching portions 71L and 71R are formed by stitching (joining) the outer circumferential edges 50*a* of the outer left panel 48L and the outer right panel 48R with outer circumferential edges 58*b* of the inner left panel 58L and the inner right panel 58R, respectively (refer to FIGS. 3 and 4).

The longitudinal tether 37 disposed inside the bag main body 17 is made of a flexible sheet material. The longitudinal tether 37 is connected to the bottom portion (the front end 33a) of the concave portion 33 and the circumferential edge portion 25 of the gas inlet port 24, and is disposed in the bag main body 17 so as to pull the front end 33a of the concave portion 33 to the front when the airbag is completely inflated. In more detail, in the embodiment, as illustrated in FIG. 3, the longitudinal tether 37 includes a front portion 38 adjacent to the circumferential wall portion 18 and a rear portion 42 adjacent to the occupant-side wall portion 32.

Figure 5:
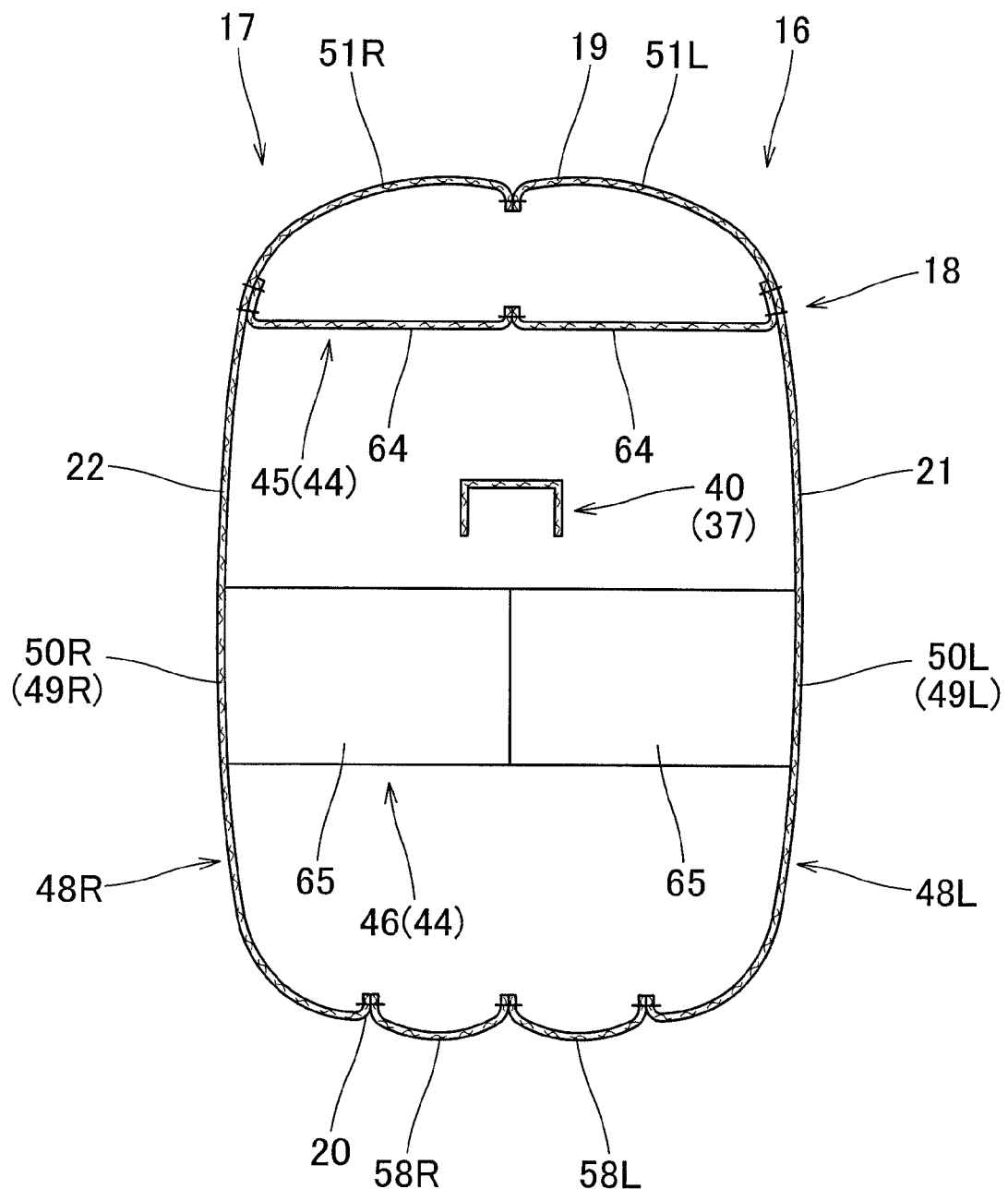
FIG. 5 is a schematic cross-sectional view of the airbag taken along line V-V in FIG. 3.
Figure 9:
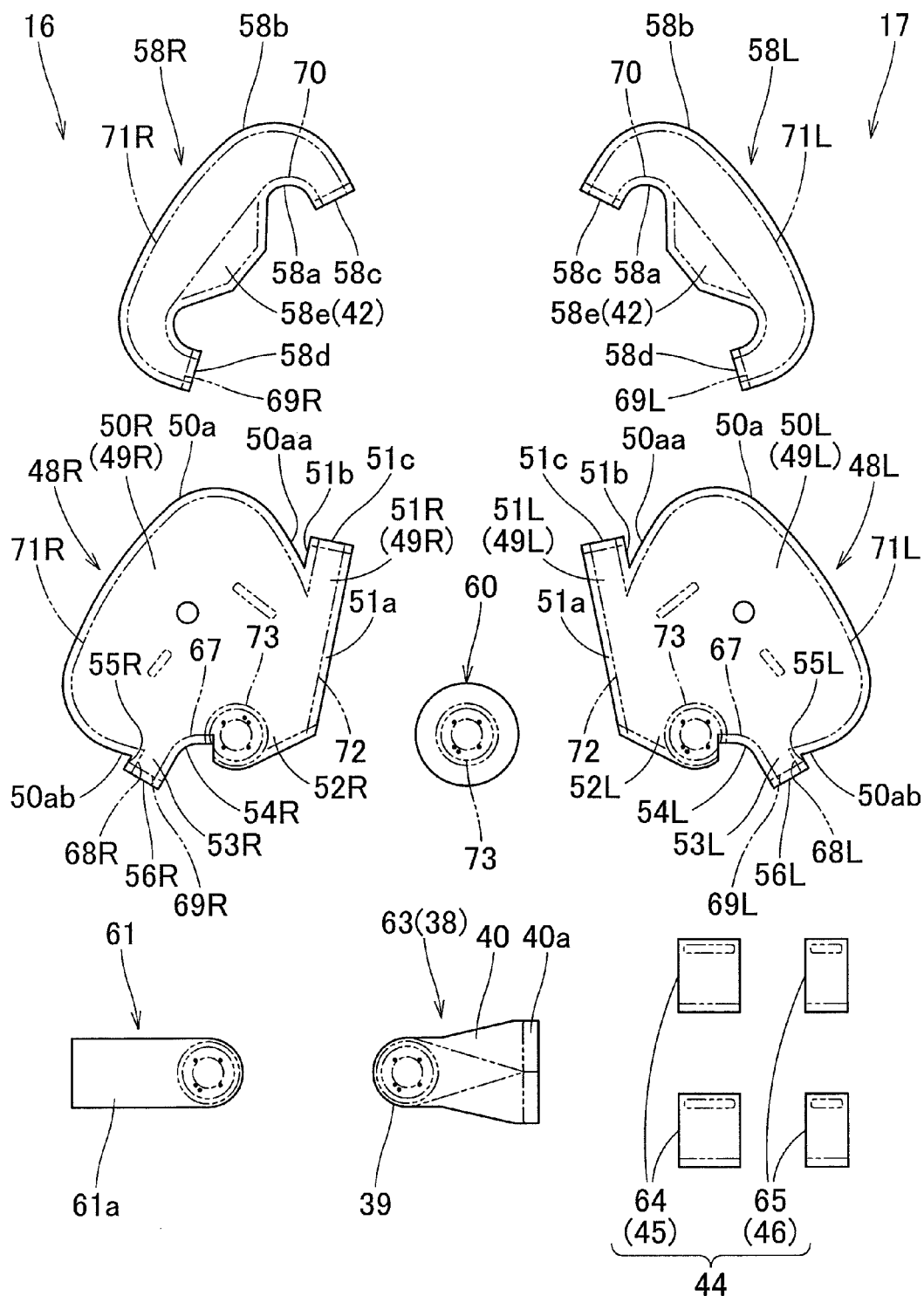
FIG. 9 illustrates plan views of basic fabrics of the airbag of the first embodiment.

In the embodiment, the front portion 38 is formed by folding a material 63 for a front portion illustrated in FIG. 9. The front portion 38 has a bilaterally symmetrical shape with the gas inlet port 24 as the center. Specifically, the front portion 38 has a three-dimensional exterior shape similar to a substantially trigonal pyramidal shape, in which a front end of the front portion 38 extends along a substantially lateral direction, and a rear end of the front portion 38 extends along a substantially vertical direction when the bag main body 17 is completely inflated (refer to FIGS. 3 and 4). In the embodiment, as illustrated in FIG. 9, a connection portion 39 for connection of the front portion 38 to the bag main body 17 is formed in a front end region of the front portion 38 so as to have a substantially semicircular-shaped front edge. Openings (reference numeral omitted) are formed in the connection portion 39 so as to correspond to the gas inlet port 24 and the attachment hole 26. The entire circumference of the connection portion 39 is stitched with the lower wall portion 20 of the bag main body 17 via the circumferential edge stitching portion 73 in the circumferential edge portion 25 of the gas inlet port 24. Specifically, the connection portion 39 is stitched with the lower wall portion 20 via a reinforcement fabric 61 which will be described later. A main body portion 40 is formed of a region of the front portion 38, which extends to the rear from the gas inlet port 24. The main body portion 40 has a three-dimensional exterior shape similar to a substantially trigonal pyramidal shape. Specifically, as illustrated in FIG. 5, the bottom of the main body portion 40 is open, and the top of the main body portion 40 is blocked. A portion at a rear end 40a of the main body portion 40 is stitched with a front end 42a of the rear portion 42, and has substantially the same vertical width dimension as a vertical width dimension of a portion at the front end 42a of the rear portion 42.

The rear portion 42 has a sheet-like shape. In the embodiment, the rear portion 42 is formed of extension portions 58e which extend from the respective inner circumferential edges 58a of the inner left panel 58L and the Inner right panel 58R of the occupant-side wall portion 32 in the bag main body 17, and which are respectively integrally formed with the inner left panel 58L and the inner right panel 58R (refer to FIGS. 3, 4, and 9). In other words, the rear portion 42 is formed of two sheets of panels which overlap each other. Since the rear portion 42 is integrally formed with the inner left panel 58L and the inner right panel 58R, the rear end 42b of the rear portion 42 is joined with the front end 33a of the concave portion 33 of the occupant-side wall portion 32. Specifically, in the embodiment, the rear portion 42 has a substantially trapezoidal shape in such a manner that the front end 42a connected to the front portion 38 has a narrow width, and a region at the rear end 42b of the rear portion 42 expands in the vertical direction toward the inner circumferential edge 58a of each of the inner left panel 58L and the inner right panel 58R.

The lateral tether 44 is disposed along a substantially lateral direction so as to connect the left wall portion 21 and the right wall portion 22 when the bag main body 17 is completely inflated. In the embodiment, as illustrated in FIG. 3, the lateral tethers 44 are disposed at two regions which are respectively positioned above and below the longitudinal tether 37.

In the lateral tethers 44, an upper lateral tether 45 disposed above the longitudinal tether 37 is made of a sheet-like flexible material, and has a substantially belt-like shape in which a longitudinal direction of the upper lateral tether 45 is present along a substantially lateral direction. When seen from the side, the upper lateral tether 45 is disposed so as to incline in the longitudinal direction so that a rear end of the upper lateral tether 45 is positioned above a front end of the upper lateral tether 45 when the bag main body 17 is completely inflated (refer to FIG. 3). In the embodiment, the upper lateral tether 45 is made of two sheets of materials 64 for an upper lateral tether, which can be split into right and left sheet, respectively. The configuration of the upper lateral tether 45 is as follows (refer to FIG. 5). One end of one material 64 for an upper lateral tether is stitched with a center portion 50L of the outer left panel 48L of the left wall portion 21. One end of the other material 64 for an upper lateral tether is stitched with a center portion 50R of the outer right panel 48R of the right wall portion 22. The other ends of the materials 64 for an upper lateral tether 45 are stitched with each other.

In the lateral tethers 44, a lower lateral tether 46 disposed below the longitudinal tether 37 is made of a substantially sheet-like flexible material, and has a substantially belt-like shape in which a longitudinal direction of the lower lateral tether 46 is present along a substantially lateral direction. When seen from the side, the lower lateral tether 46 is disposed so as to incline in the longitudinal direction so that an upper end of the lower lateral tether 46 is positioned in front of a lower end of the lower lateral tether 46 at the complete inflation of the bag main body 17. In the embodiment, when the completely inflated bag main body 17 is seen from the side, the lower lateral tether 46 is disposed so as to be substantially orthogonal to the upper lateral tether 45 (refer to FIG. 3). In the embodiment, the lower lateral tether 46 is made of two sheets of materials 65 for a lower lateral tether, which can be split into right and left sheets, respectively. The configuration of the lower lateral tether 46 is as follows (refer to FIG. 5). One end of one material 65 for a lower lateral tether is stitched with the outer left panel 48L of the left wall portion 21. One end of the other material 65 for a lower lateral tether is stitched with the outer right panel 48R of the right wall portion 22. The other ends of the materials 65 for a lower lateral tether 46 are stitched together.

In the embodiment, the upper lateral tether 45 is set to have a width dimension different from that of the lower lateral tether 46. The upper lateral tether 45 is set to have a large width, which is approximately 1.5 times a width dimension of the lower lateral tether 46 (refer to FIGS. 3 and 9).

The bag main body 17 has a bag shape in which circumferential edges of basic fabrics of predetermined shapes are stitched together. In the embodiment, as illustrated in FIG. 9, the bag main body 17 is configured to have four sheets of basic fabrics: the outer left panel 48L and the outer right panel 48R which are disposed on outer sides in the lateral direction when the bag main body 17 is completely inflated, and the inner left panel 58L and the inner right panel 58R which are disposed on inner sides in the lateral direction when the bag main body 17 is completely inflated. The bag main body 17 has a bag shape in which circumferential edges of the four basic fabrics are stitched together. In addition, the bag main body 17 includes two sheets of reinforcement fabrics 60 and 61 for reinforcement of the circumferential edge portion 25 of the gas inlet port 24.

Figure 10:
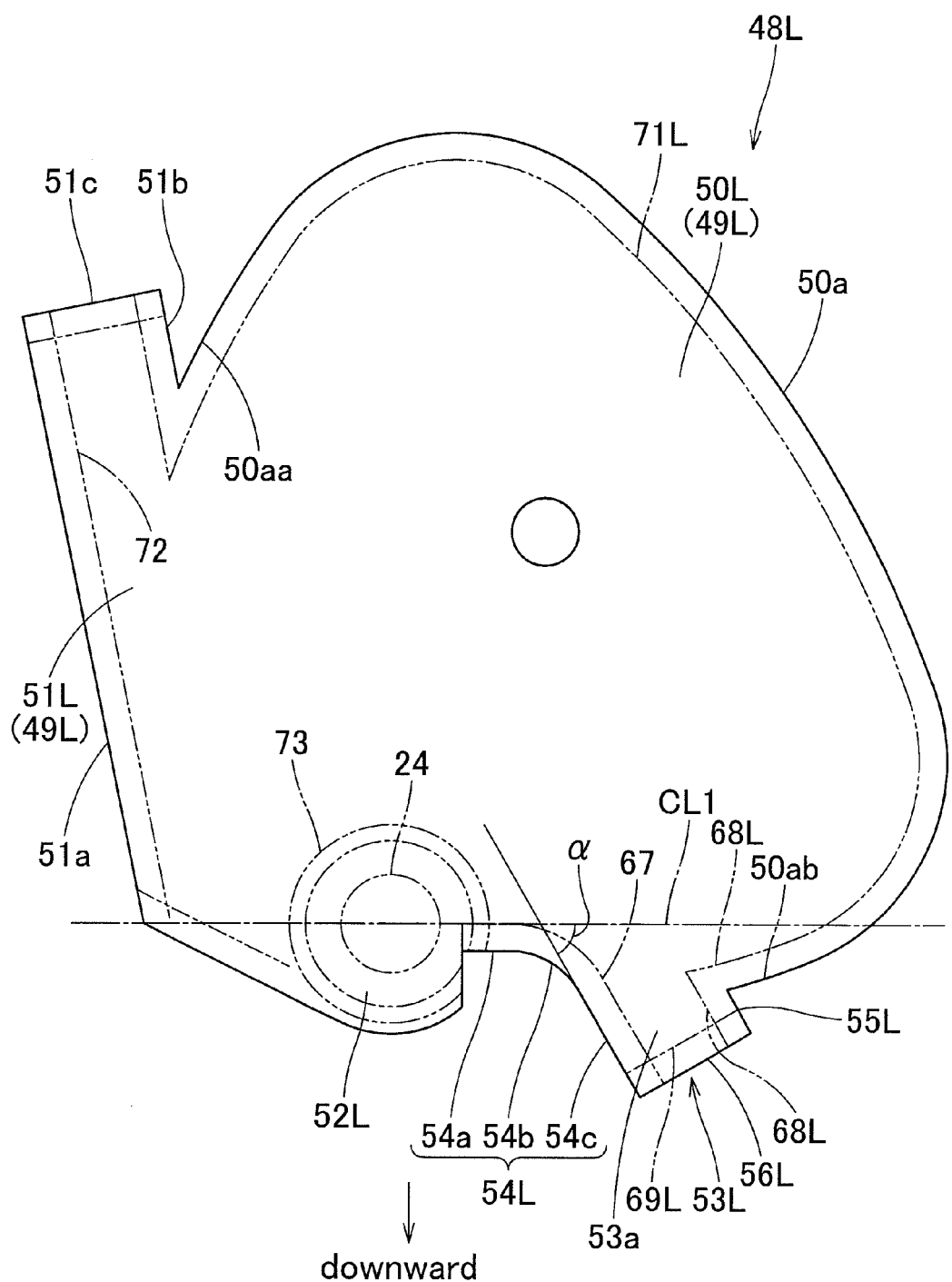
FIG. 10 is a plan view of an outer left panel of the airbag of the first embodiment.

As illustrated in FIGS. 9 and 10, the outer left panel 48L includes an outer left panel main body 49L, an inlet port configuration portion 52L, and the support inflation configuration portion 53L. Since the inlet port configuration portion 52L forms the circumferential edge portion 25 of the gas inlet port 24, the inlet port configuration portion 52L is positioned in a front portion at a lower edge of the outer left panel main body 49L. Since the support inflation configuration portion 53L forms the support inflation portion 29, the support inflation configuration portion 53L is positioned in a rear portion at the lower edge of the outer left panel main body 49L. The outer left panel main body 49L includes the center portion 50L forming the left wall portion 21, and an upper portion 51L. Since the upper portion 51L forms a left portion of the upper wall portion 19, the upper portion 51L is disposed above the center portion 50L. Specifically, the inlet port configuration portion 52L is disposed below the center portion 50L. The support inflation configuration portion 53L is disposed in back of the inlet port configuration portion 52L. The center portion 50L has a substantially elliptical exterior shape. In the bag main body 17 of the embodiment, the center portion 50L forms the entire left wall portion 21 of the circumferential wall portion 18, and a region on the left of the protruding apex portion 34a of the protrusion portion 34L of the occupant-side wall portion 32. In the embodiment, as illustrated in FIG. 10, when the outer left panel 48L is flatly deployed, the center portion 50L is formed in such a manner that a lower end portion of the outer circumferential edge 50a extends downwards further than a datum line CL1. The datum line CL1 is a line obtained by projecting a center extension line on the flatly deployed outer left panel 48L. The center extension line is a line obtained by extending a center line that is disposed along the longitudinal direction so as to pass through the opening plane and the center of the gas inlet port 24 at the installation of the airbag in the vehicle. The upper portion 51L has a substantially belt-like shape in which a distal end (a rear edge 51c) of the upper portion 51L is separated from the center portion 50L. In the embodiment, the upper portion 51L forms a left region of the upper wall portion 19 of the circumferential wall portion 18 in the bag main body 17 (refer to FIG. 7). The inlet port configuration portion 52L forms a front region of the lower wall portion 20, which is the circumferential edge portion 25 of the gas inlet port 24. The inlet port configuration portion 52L protrudes from the center portion 50L so as to have a substantially semielliptic shape so that the inlet port configuration portion 52L overlaps with an inlet port configuration portion 52R formed in the outer right panel 48R.

When the outer left panel 48L is flatly deployed in a state where a vertical direction of the outer left pane 48L coincides with the vertical direction of the completely inflated airbag 16, the support inflation configuration portion 53L is adjacent to the rear of the inlet port configuration portion 52L. The support inflation configuration portion 53L is formed in such a manner that the support inflation configuration portion 53L extends to the rear from the inlet port configuration portion 52L, and a rear end 53a of the support inflation configuration portion 53L is separated from the center portion 50L of the outer left panel main body 49L. The support inflation configuration portion 53L is disposed in such a manner that the support inflation configuration portion 53L inclines to protrude to the rear and downwards, and has a substantially belt-like shape. As illustrated in FIG. 10, in the support inflation configuration portion 53L of the embodiment, the lower edge 54L is configured to have a linear portion 54a which is a portion of the lower edge 54L positioned toward the inlet port configuration portion 52L (on the front side); an inclined linear portion 54c which is positioned in a distal end (rear end) portion of the lower edge 54L; and a curved portion 54b which is positioned in a middle portion of the lower edge 54L in the longitudinal direction. The linear portion 54a extends to the rear from the inlet port configuration portion 52L along the datum line CL1. The inclined linear portion 54c inclines to the rear and downwards with respect to the datum line CL1. The curved portion 54b bends to the rear and downwards from the linear portion 54a so as to smoothly connect the linear portion 54a and the inclined linear portion 54c. That is, the lower edge 54L includes the linear portion 54a, the curved portion 54b, and the inclined linear portion 54c. In the embodiment, the inclined linear portion 54c is set to have an incline angle α of approximately 60° with respect to the datum line CL1 (refer to FIG. 10). In the support inflation configuration portion 53L (the support inflation portion 29), a portion in the vicinity of the linear portion 54a is disposed inside the case 13 when the airbag 16 is completely inflated. The linear portion 54a extends to the rear across the circumferential edge stitching portion 73 disposed in the circumferential edge portion 25 of the gas inlet port 24.

An upper edge 55L of the support inflation configuration portion 53L is separated from the outer circumferential edge 50a of the center portion 50L at the rear end 53a of the support inflation configuration portion 53L. In the embodiment, the upper edge 55L is substantially parallel with the inclined linear portion 54c of the lower edge 54L. The rear edge 56L of the support inflation configuration portion 53L corresponds to the front lower edge 58d of the inner left panel 58L. In the embodiment, the rear edge 56L is substantially orthogonal to the inclined linear portion 54c of the lower edge 54L and the upper edge 55L. Furthermore, when the outer left panel 48L is flatly deployed, the lower edge 54L and the upper edge 55L of the support inflation configuration portion 53L are disposed so as to protrude downwards further than the datum line CL1. In the embodiment, the linear portion 54a of the lower edge 54L is positioned on the datum line CL1. The curved portion 54b and the inclined linear portion 54c of the lower edge 54L and the upper edge 55L are disposed so as to be positioned below the datum line CL1. According to a stitching margin illustrated in FIG. 10, the linear portion 54a is positioned to be shifted downwards further than the datum line CL1. However, in practicality, the linear portion 54a is disposed so as to substantially coincide with the datum line CL1 in the support inflation configuration portion 53L. In the embodiment, the support inflation configuration portion 53L has substantially the same width dimension as an inner diameter dimension of the gas inlet port 24. As illustrated in FIG. 9, since the configuration of the outer right panel 48R is bilaterally symmetrical with that of the outer left panel 48L, the detailed description of the outer right panel 48R will be omitted.

The inner left panel 58L and the inner right panel 58R form a region between the respective protruding apex portions 34a of the protrusion portions 34L and 34R in the occupant-side wall portion 32. Specifically, the inner left panel 58L and the inner right panel 58R form a region that is formed across from a rear portion of the upper wall portion 19 of the circumferential wall portion 18 to a rear portion of the support inflation portion 29 of the lower wall portion 20 of the circumferential wall portion 18 via between the protruding apex portions 34a of the protrusion portions 34L and 34R of the occupant-side wall portion 32. The inner left panel 58L and the inner right panel 58R bilaterally split the formed region into two left and right regions at the position of the bottom portion (the front end 33a) of the concave portion 33. The inner left panel 58L and the inner right panel 58R form the two split regions, respectively. The inner left panel 58L forms a region from the front end 33a of the concave portion 33 to the protruding apex portion 34a of the left protrusion portion 34L. The inner right panel 58R forms a region from the front end 33a of the concave portion 33 to the protruding apex portion 34a of the right protrusion portion 34R. The inner left panel 58L and the inner right panel 58R are a pair of left and right panels, respectively, each of which bends to have a substantially C shape. In other words, as illustrated in FIG. 9, each of the inner left panel 58L and the inner right panel 58R has a substantially belt-like shape in which each of the outer circumferential edge 58b and the inner circumferential edges 58a bends so as to be concave toward the rear. In the embodiment, the extension portions 58e consisting of the rear portion 42 of the longitudinal tether 37 are formed at the inner circumferential edges 58a of the inner left panel 58L and the inner right panel 58R, respectively. The inner left panel 58L and the inner right panel 58R are configured in such a manner that the outer circumferential edges 58b of the inner left panel 58L and the inner right panel 58R in flatly deployed state are substantially aligned along the curved shapes of the outer circumferential edges 50a of the center portions 50L and 50R of the outer left panel 48L and the outer right panel 48R, respectively.

The reinforcement fabric 60 for the reinforcement of the circumferential edge portion 25 of the gas inlet port 24 is disposed above the circumferential edge portion 25 of the gas inlet port 24 inside the bag main body 17. The reinforcement fabric 60 has a substantially circular exterior shape. Specifically, as illustrated in FIG. 9, the reinforcement fabric 60 is set to have an outer diameter dimension greater than that of the connection portion 39 of the front portion 38 of the longitudinal tether 37, and that of a rear end portion of the reinforcement fabric 61 which will be described later. In the embodiment, the reinforcement fabric 60 is disposed at an innermost position. The reinforcement fabric 61 is disposed between the front portion 38 of the longitudinal tether 37 and the inlet port configuration portion 52L of the outer left panel 48L. The reinforcement fabric 61 includes a belt-like extension portion 61a that extends from the gas inlet port 24 to the front. As illustrated in FIG. 3, when the airbag 16 is completely inflated, the extension portion 61a covers a wide longitudinal range of an inner circumference of an upper stitching portion 72 which will be described later. The extension portion 61a is intended to prevent a front end portion of the upper stitching portion 72 from being in direct contact with inflation gas flowing into the bag main body 17 via the gas inlet port 24. In the embodiment, the reinforcement fabrics 60 and 61 are stitched with the circumferential edge portion 25 (the inlet port configuration portions 52L and 52R) of the gas inlet port 24 along with the front portion 38 of the longitudinal tether 37 by the double circular circumferential edge stitching portion 73 formed in the circumferential edge portion 25 of the gas inlet port 24.

In the embodiment, each of the following is made of a flexible woven fabric which is woven with polyester yarn, polyamide yarn, or the like: the outer left panel 48L, the outer right panel 48R, the inner left panel 58L, the inner right panel 58R of the bag main body 17; the reinforcement fabrics 60 and 61; the material 63 for a front portion of the longitudinal tether 37; the materials 64 for an upper lateral tether of the upper lateral tether 45; and the materials 65 for a lower lateral tether of the lower lateral tether 46.

Subsequently, manufacturing of the airbag 16 will be described. The inner left panel 58L and the inner right panel 58R are stitched together in advance. When the inner left panel 58L and the inner right panel 58R are flatly deployed, the outer circumferential edges 58b are placed to match each other in a state the outer circumferential edges 58b overlap each other. The inner circumferential edges 58a are stitched together using stitching yarn so that an inner stitching portion 70 is formed (refer to FIG. 12B).

Figure 11A:
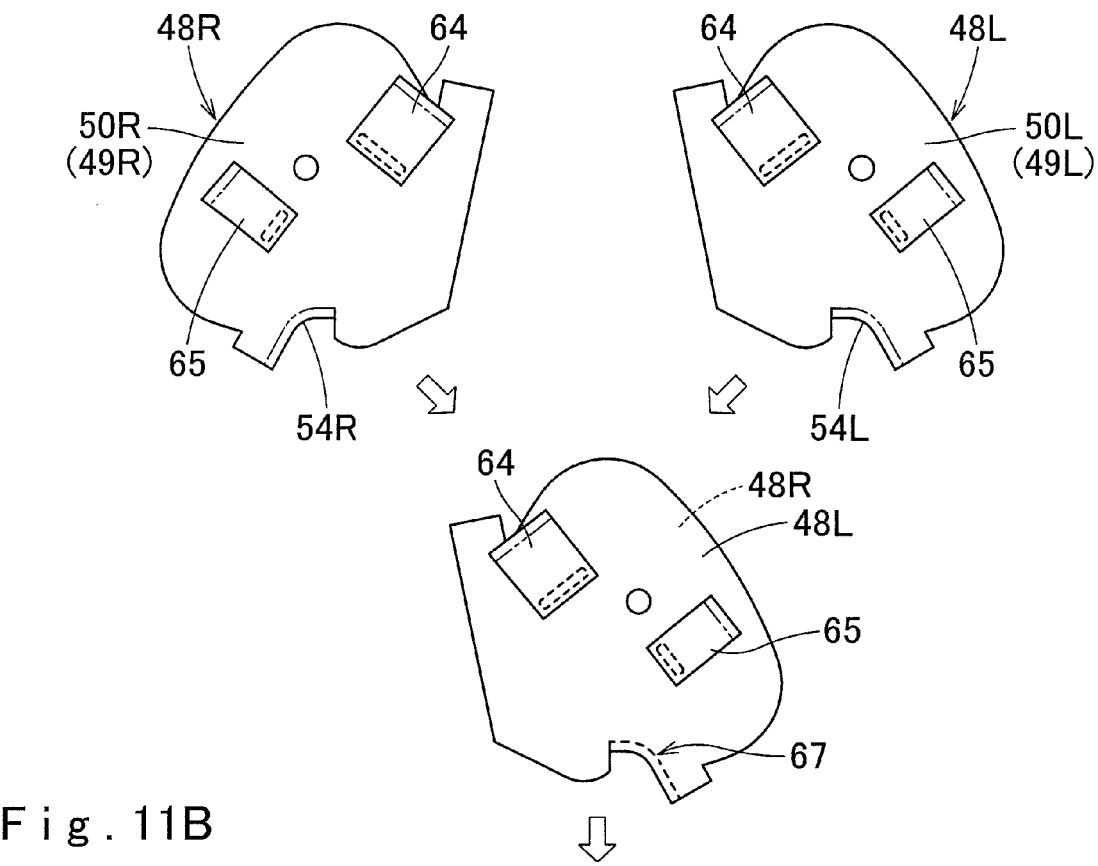
Figure 11B:
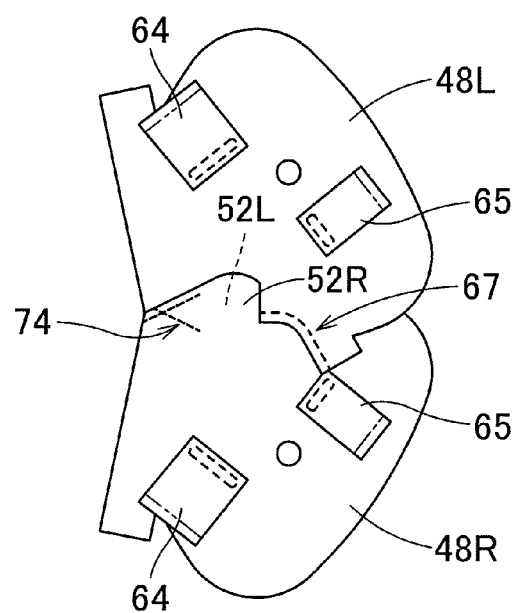

First, as illustrated in FIG. 11A, one end of one material 64 for an upper lateral tether of the upper lateral tether 45 is stitched with the outer left panel 48L using stitching yarn. In addition, one end of the other material 64 for an upper lateral tether of the upper lateral tether 45 is stitched with the outer right panel 48R using stitching yarn. Similarly, one end of one material 65 for a lower lateral tether of the lower lateral tether 46 is stitched with the outer left panel 48L using stitching yarn. In addition, one end of the other material 65 for a lower lateral tether of the lower lateral tether 46 is stitched with the outer right panel 48R using stitching yarn. Subsequently, the outer left panel 48L and the outer right panel 48R are flatly deployed to overlap each other. The respective lower edges 54L and 54R of the support inflation configuration portions 53L and 53R are stitched together using stitching yarn so that a center stitching portion 67 is formed. Thereafter, as illustrated in FIG. 11B, the outer left panel 48L and the outer right panel 48R are spread out in a state where the inlet port configuration portions 52L and 52R overlap each other with the center stitching portion 67 as the center. A substantially V-shaped circumferential edge stitching portion 74 is formed using stitching yarn so as to join a front region of the inlet port configuration portion 52L with a front region of the inlet port configuration portion 52R (refer to FIG. 11B). Subsequently, the following overlaps each other on the inlet port configuration portions 52L and 52R in sequence: the reinforcement fabric 61; the material 63 for a front portion, which forms the front portion 38 of the longitudinal tether 37; and the reinforcement fabric 60. The inlet port configuration portions 52L and 52R, the reinforcement fabric 61, the material 63 for a front portion, and the reinforcement fabric 60 are stitched together using stitching yarn so as to form the double circular circumferential edge stitching portion 73 in the circumferential edge portion 25 of the gas inlet port 24. Thereafter, the gas inlet port 24 and the attachment holes 26 are formed by a drilling process (refer to FIG. 12A).

Figure 13A:
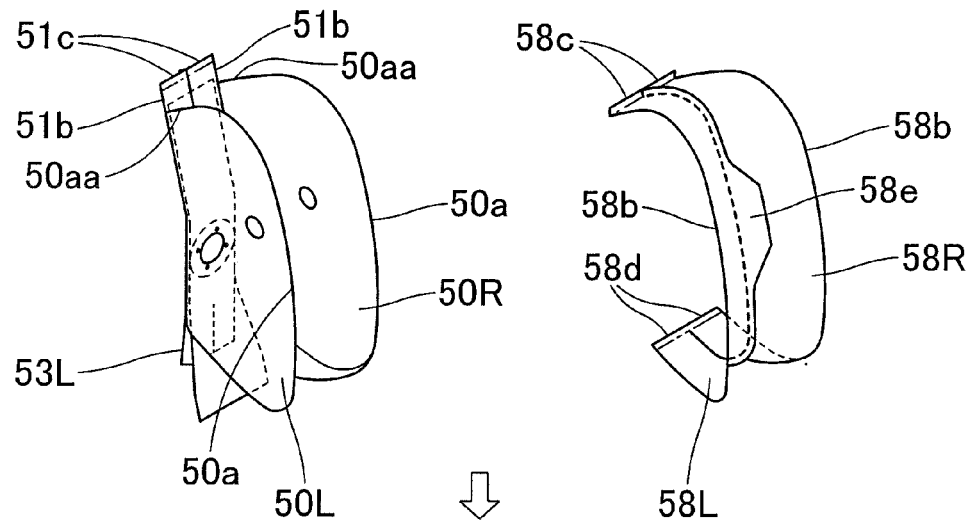
Figure 13B:
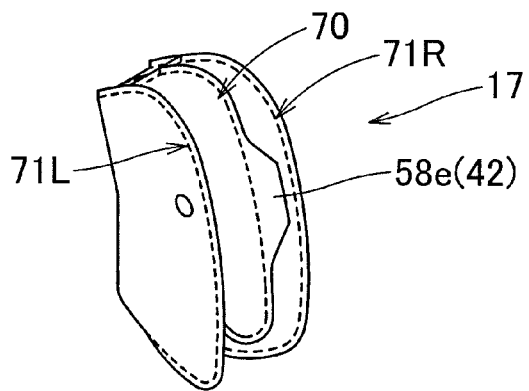

Subsequently, respective upper edges 51a of the upper portions 51L and 51R are placed to match each other in a state where the outer left panel 48L and the outer right panel 48R overlap each other. The upper edges 51a are stitched together using stitching yarn so that the upper stitching portion 72 is formed (refer to FIG. 12B). Thereafter, the outer left panel 48L and the outer right panel 48R are flatly spread out with the upper stitching portion 72 as the center. In addition, the inner left panel 58L and the inner right panel 58R are spread out with the inner stitching portion 70 as the center. As illustrated in FIG. 13A, the rear edges 51c of the upper portions 51L and 51R of the outer left panel 48L and the outer right panel 48R are respectively stitched with front upper edges 58c of the inner left panel 58L and the inner right panel 58R using stitching yarn. Similarly, the rear edges 56L and 56R of the support inflation configuration portions 53L and 53R of the outer left panel 48L and the outer right panel 48R are respectively stitched with the front lower edges 58d of the inner left panel 58L and the inner right panel 58R using stitching yarn. As a result, the lateral stitching portions 69L and 69R are formed. Thereafter, a front upper end portion 50aa of the outer circumferential edge 50a of the center portion 50L of the outer left panel 48L is stitched with a lower edge 51b of the upper portion 51L using stitching yarn. A front lower end portion 50ab of the outer circumferential edge 50a of the center portion 50L is stitched with the upper edge 55L of the support inflation configuration portion 53L using stitching yarn. The outer circumferential edge 50a is stitched with the outer circumferential edge 58b of the inner left panel 58L using stitching yarn. As a result, the outer stitching portion 71L and the end stitching portion 68L are formed. Similarly, the front upper end portion 50aa of the outer circumferential edge 50a of the center portion 50R of the outer right panel 48R is stitched with the lower edge 51b of the upper portion 51R using stitching yarn. The front lower end portion 50ab of the outer circumferential edge 50a of the center portion 50R is stitched with the upper edge 55R of the support inflation configuration portion 53R using stitching yarn. The outer circumferential edge 50a is stitched with the outer circumferential edge 58b of the inner right panel 58R using stitching yarn. As a result, the outer stitching portion 71R and the end stitching portion 68R are formed. Accordingly, as illustrated in FIG. 13B, it is possible to manufacture the bag main body 17.

Figure 13C:
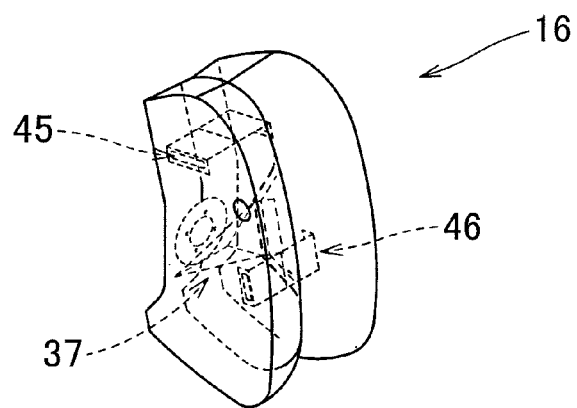

Thereafter, the bag main body 17 is inverted using the gas inlet port 24 in such a manner that stitching margin of the edge portion is not exposed to the outside. The main body portion 40 of the front portion 38 is folded in half, and then the folded main body portion 40 is pulled out of the gas inlet port 24. In addition, the respective extension portions 58e of the inner left panel 58L and the inner right panel 58R are pulled out of the gas inlet port 24. The rear end 40a of the main body portion 40 of the front portion 38 is stitched with the extension portions 58e of the inner left panel 58L and the inner right panel 58R using stitching yarn so that the longitudinal tether 37 is formed. The other respective ends of the materials 64 for an upper lateral tether are pulled out of the gas inlet port 24 and are stitched together so that the upper lateral tether 45 is formed. Similarly, the other respective ends of the materials 65 for a lower lateral tether are pulled out of the gas inlet port 24 and are stitched together so that the lower lateral tether 46 is formed. As illustrated in FIG. 13C, it is possible to manufacture the airbag 16 in this manner. That is, in the embodiment, it is possible to manufacture the airbag 16 using only a two-dimensional stitching operation.

Figure 14:
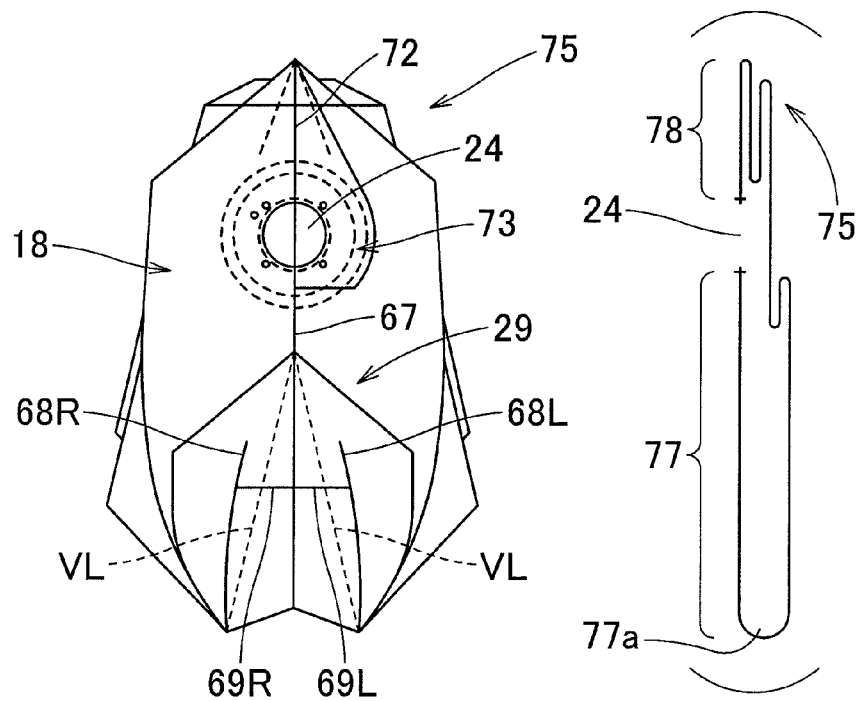
FIG. 14 is a bottom view of a pre-folded airbag into which the airbag of the first embodiment is pre-folded.
Figure 15:
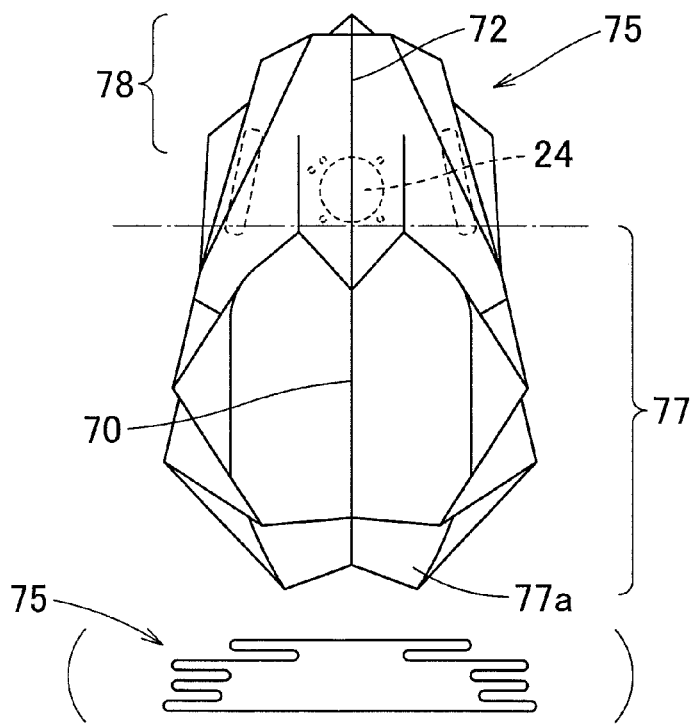
FIG. 15 is a plan view of the pre-folded airbag in FIG. 14.

After the airbag 16 is manufactured, the bolts 10a are set to protrude through the attachment holes 26, and the retainer 10 is provided inside the airbag 16. Thereafter, the airbag 16 is folded. Specifically, a pre-folded airbag 75 illustrated in FIGS. 14 and 15 are folded through the following folding processes so as to obtain the airbag 16 with respective width dimensions reduced in both longitudinal and lateral directions: a longitudinal size reduction folding process in which the pre-folded airbag 75 is folded along a folding mark present along the lateral direction, and a lateral size reduction folding process in which the pre-folded airbag 75 is folded along a folding mark present along the longitudinal direction. The pre-folded airbag 75 has a substantially symmetrical shape in the lateral direction and a substantially flat deployed shape in which the circumferential wall portion 18 is folded along the respective folding marks present along the lateral and the longitudinal directions in such a manner that the respective protruding apex portions 34a of the protrusion portions 34L and 34R are spread out in the lateral direction, and the occupant-side wall portion 32 is flatly deployed, as illustrated in FIGS. 14 and 15.

Figure 16A:
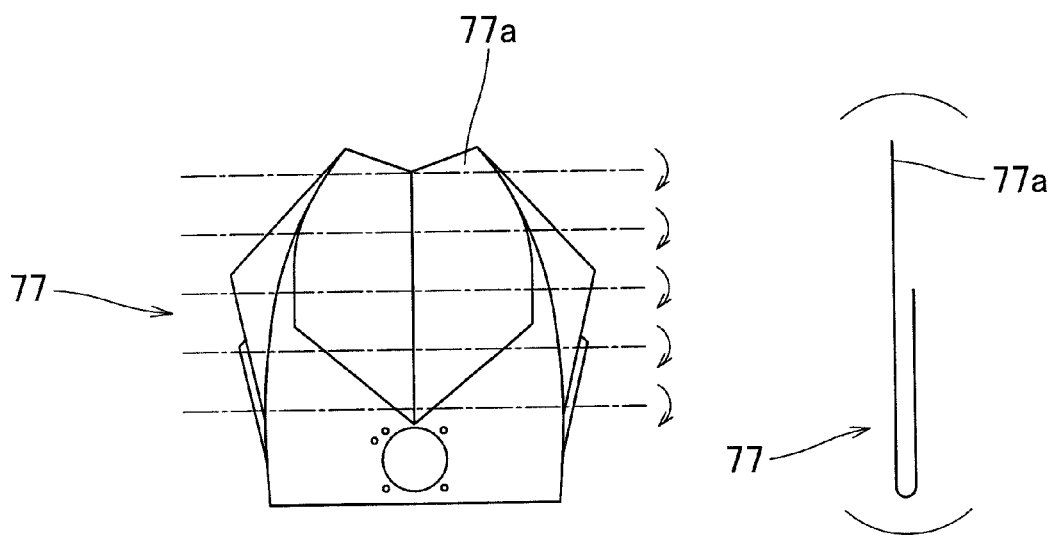
FIGS. 16A, 16B, 17A and 17B are schematic views illustrating a process of folding the airbag of the first embodiment.
Figure 16B:
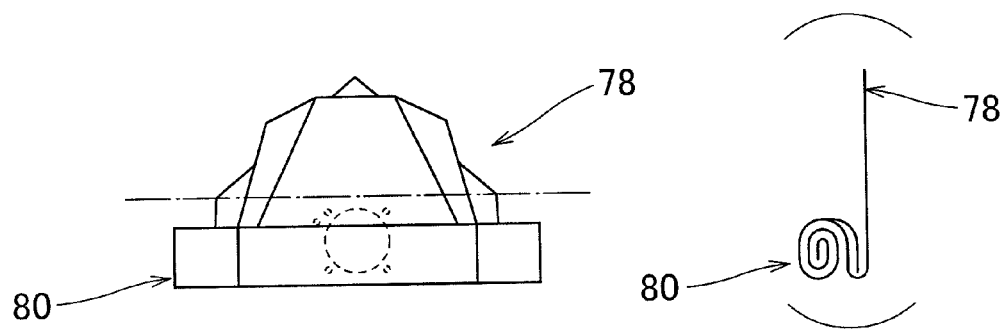
Figure 17A:
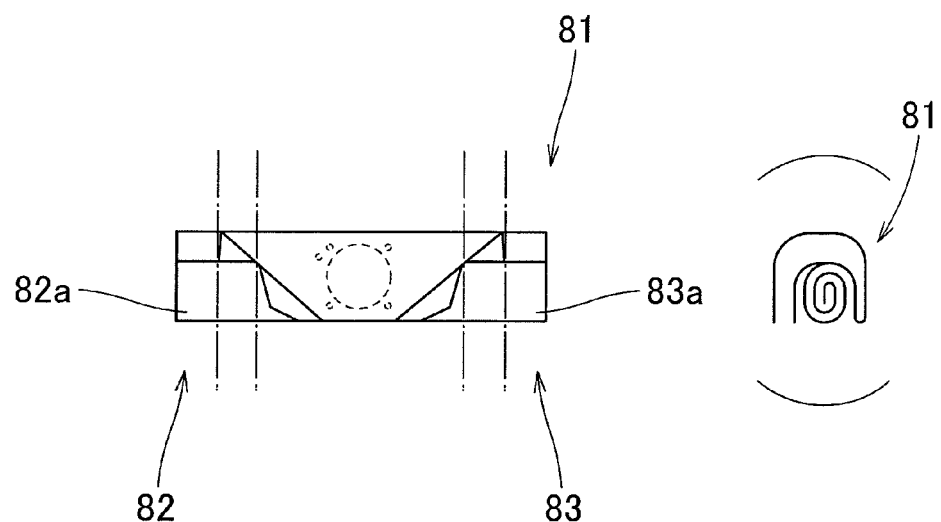

As illustrated in FIGS. 14 and 15, the following stitching portions are disposed in the pre-folded airbag 75 at substantially the center in the lateral direction: the inner stitching portion 70; the center stitching portion 67 that is disposed so as to continue from the inner stitching portion 70; and the upper stitching portion 72 that is disposed so as to continue from the inner stitching portion 70. The inner stitching portion 70, the center stitching portion 67, and the upper stitching portion 72 are disposed along a substantially longitudinal direction over substantially the entire circumference of the pre-folded airbag 75 except for the circumferential edge portion 25 of the gas inlet port 24. In addition, a portion in the vicinity of the support inflation portion 29 in the pre-folded airbag 75 is folded into a substantially flat shape. Specifically, in FIG. 14, the circumferential wall portion 18 is folded at positions in the lateral direction outside the end stitching portions 68L and 68R along folding marks VL, each of which inclines in the longitudinal direction in order for a rear side of the folding mark VL to face the outside in the lateral direction. The portion in the vicinity of the support inflation portion 29 is folded into a substantially flat shape by the folding of the circumferential wall portion 18. First, as illustrated in FIGS. 15 and 16A, the pre-folded airbag 75 is roll-folded in such a manner that a rear portion 77 is rolled from a rear end 77a toward the circumferential wall portion 18, and the rear portion 77 is positioned on a rear side of the gas inlet port 24 in the pre-folded airbag 75. Accordingly, a roll folded portion 80 is formed. Subsequently, the roll folded portion 80 is inverted, and thus is mounted on the gas inlet port 24. Thereafter, as illustrated in FIGS. 16B and 17A, a front portion 78 is folded backwards from the front so as to cover the roll folded portion 80, and the front portion 78 is positioned on a front side of the gas inlet port 24 in the pre-folded airbag 75. Accordingly, a folded airbag 81 with a reduced longitudinal size is formed.

Figure 17B:
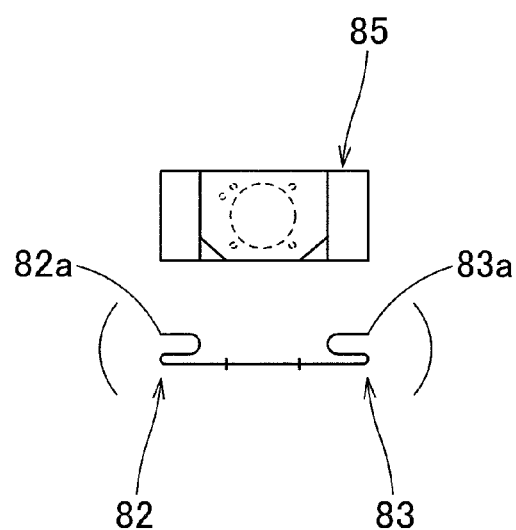

Thereafter, as illustrated in FIGS. 17A and 17B, the folded airbag 81 with a reduced longitudinal size undergoes the lateral size reduction folding process in such a manner that a left portion 82 and a right portion 83 are bellows-folded to approach the gas inlet port 24 while respective distal ends 82a and 83a face the outside in the lateral direction, and thus the bellows folded left portion 82 and the bellows folded right portion 83 are mounted on the gas inlet port 24. The left portion 82 and the right portion 83 are respectively positioned on left and right sides of the gas inlet port 24. Accordingly, as illustrated in FIG. 17B, a completely folded body 85 is formed. Thereafter, a breakable wrap sheet which is not illustrated is wrapped around the completely folded body 85 in such a manner that the folded state is retained.

Subsequently, the folded airbag 16 (the completely folded body 85) is placed on the bottom wall portion 13a of the case 13. The main body portion 9a of the inflator 9 is inserted into the case 13 from below the bottom wall portion 13a. At the same time, the bolts 10a protruding downwards from the bottom wall portion 13a are inserted through the flange portion 9c of the inflator 9. Thereafter, the bolts 10a protruding from the flange portion 9c of the inflator 9 are tightened by the nuts 11. In this manner, it is possible to attach the folded airbag 16 and the inflator 9 to the case 13.

The circumferential wall portion 13b of the case 13 is locked into the connecting wall portion 7c of the airbag cover 7 of the instrument panel 1 installed in the vehicle. Subsequently, it is possible to install the airbag apparatus M1 in the vehicle by fixing the bracket of the case 13, which is not illustrated, to the body of the vehicle.

When the vehicle equipped with the airbag apparatus M1 undergoes a front collision, inflation gas is discharged through each gas discharge port 9b of the inflator 9, and the inflation gas flows into the airbag 16 and inflates the airbag 16. As illustrated in FIG. 18, the inflating airbag 16 pushes and opens the door portions 7a and 7b of the airbag cover 7.

Thereafter, the airbag 16 is inflated and deployed to protrude to the rear and upwards via an opening which is formed by the opening of the door portions 7a and 7b of the airbag cover 7, and as illustrated in FIG. 18, the inflation of the airbag 16 is completed.

In the embodiment, the support inflation portion 29 is formed on a portion of the airbag 16, which is positioned on the rear side of the gas inlet port 24 when the airbag 16 is completely inflated, so as to protrude downwards. As illustrated in FIG. 18, when the airbag 16 is completely inflated, the support inflation portion 29 is in contact with the rear surface 3 of the instrument panel 1, which is positioned on the rear side of the accommodating portion (the case 13), and is supported by the instrument panel 1. The support inflation portion 29 is formed of the support inflation configuration portions 53L and 53R which are respectively formed in the outer left panel 48L and the outer right panel 48R of the airbag 16. When the airbag 16 is completely inflated, the center stitching portion 67 as the center joining portion is disposed at the center of the support inflation portion 29 in the lateral direction so as to continue from the inner stitching portion 70 (the inner joining portion) and to extend to the front. The center stitching portion 67 is formed by joining (stitching) together the respective lower edges 54L and 54R of the support inflation configuration portions 53L and 53R. When the outer left panel 48L and the outer right panel 48R are flatly deployed, the lower edges 54L and 54R of the support inflation configuration portions 53L and 53R forming of the center stitching portion 67 incline to the rear and downwards from the rear sides of the inlet port configuration portions 52L and 52R, respectively. The respective lower edges 54L and 54R of the support inflation configuration portions 53L and 53R are disposed so as to protrude downwards further than the datum line CL1. For this reason, the support inflation portion 29 is disposed so as to incline to the rear and downwards, and to considerably protrude from the opening plane F of the gas inlet port 24 when the airbag 16 is completely inflated (refer to FIGS. 3 and 18).

In the support inflation portion 29 when the airbag 16 is completely inflated, the end stitching portions 68L and 68R are disposed in the right and the left regions on the rear side of the center stitching portion 67 so as to continue from the outer stitching portions 71L and 71R (the outer joining portions). The end stitching portions 68L and 68R are formed by joining the upper edges 55L and 55R of the support inflation configuration portions 53L and 53R with the outer circumferential edges 50a of the outer left panel 48L and the outer right panel 48R, respectively. In addition, when the outer left panel 48L and the outer right panel 48R are flatly deployed, the respective upper edges 55L and 55R of the end stitching portions 68L and 68R in the support inflation configuration portions 53L and 53R are disposed so as to protrude downwards further than the datum line CL1. For this reason, when the airbag 16 is completely inflated, the support inflation portion 29 is in wide surface contact with the rear surface 3 in the lateral direction, which is positioned on the rear side of the accommodating portion (the case 13) of the instrument panel 1, and the support inflation portion 29 protrudes downwards further than the opening plane F of the gas inlet port 24. That is, in the airbag 16 of the embodiment, three joining portions (the center stitching portion 67 and the two end stitching portions 68L and 68R) are disposed along a substantially longitudinal direction, and are provided in parallel with each other in the lateral direction in the considerably protruding rear region of the support inflation portion 29 (refer to FIG. 8). The rear end of the center stitching portion 67 is connected to the respective rear ends of the end stitching portions 68L and 68R via the lateral stitching portions 69L and 69R. The lateral stitching portions 69L and 69R are formed by joining together the rear edges 56L and 56R of the support inflation configuration portions 53L and 53R with the front lower edges 58d of the inner left panel 58L and the inner right panel 58R, respectively. For this reason, in the airbag 16 of the embodiment, it is possible to stably maintain a state where the considerably protruding rear portion of the support inflation portion 29 is in wide surface contact with the rear surface 3 in the lateral direction. This is because the support inflation portion 29 includes the center stitching portion 67 which is disposed at the center of the support inflation portion 29 in the lateral direction; the end stitching portions 68L and 68R which are disposed on the right and the left sides of the center stitching portion 67; and the lateral stitching portions 69L and 69R which are disposed so as to connect the center stitching portion 67 and the end stitching portions 68L and 68R. In other words, in the airbag 16 of the embodiment, the left support inflation configuration portion 53L and the right support inflation configuration portion 53R extend downwards further than the datum line CL1. For this reason, it is possible to make the length of each membrane of the right and the left outer circumferential walls longer at the inflation of the airbag 16, and when the airbag 16 is completely inflated, an extending inflation portion is formed so as to inflate from the center stitching portion 67 in the lateral direction. As a result, the support inflation portion 29 can be in wide surface contact with the rear region (the rear surface 3) of the instrument panel 1 in the lateral direction.

As a result, the airbag 16 of the embodiment includes the support inflation portion 29 in contact with the rear surface 3 of the instrument panel 1, which is positioned on the rear side of the case 13 when the airbag 16 is completely inflated, and thus it is possible to prevent occurrence of gap between the instrument panel 1 and the airbag 16.

Accordingly, in the embodiment, it is possible to inflate the airbag 16 while preventing the occurrence of the gap between the instrument panel 1 and the airbag 16. When the airbag 16 is completely inflated, the airbag 16 can be quickly supported by the instrument panel 1, and thus it is possible to accurately protect the occupant from an accident.

In the airbag 16 of the embodiment, at least the respective support inflation configuration portions 53L and 53R of the outer left panel 48L and the outer right panel 48R are substantially symmetrical with each other in the lateral direction. For this reason, it is possible to form the three-dimensional support inflation portion 29 with partial protrusion portions using a two-dimensional joining operation, and it is possible to easily manufacture the airbag 16.

Furthermore, as illustrated in FIG. 10, in the airbag 16 of the embodiment, each of the respective lower edges 54L and 54R of the support inflation configuration portions 53L and 53R includes the linear portion 54a that is disposed on the front side of the relevant lower edge and is positioned on the datum line CL1, and the curved portion 54b that bends from the linear portion 54a to the rear and downwards. For this reason, it is possible to prevent occurrence of an excessive portion in the vicinity of the gas inlet port 24. That is, as in the embodiment, when the reinforcement fabrics 60 and 61 are provided on the circumferential edges of the gas inlet port 24, it is possible to stitch the reinforcement fabrics 60 and 61 with the circumferential edge portion 25 of the gas inlet port 24 in a state where the circumferential edge portion 25 of the gas inlet port 24 is flatly deployed in the lateral direction from the linear stitching portion (the front portion of the center stitching portion 67) which is formed by stitching together the respective lower edges 54L and 54R of the outer left panel 48L and the outer right panel 48R. As a result, it is easy to stitch the reinforcement fabrics 60 and 61 with the circumferential edge portion 25 of the gas inlet port 24, and it is easier to manufacture the airbag compared to a case where each of the lower edges and has only a single linear portion that inclines from each of the lower edges and to the rear and downwards. This point being not taken into consideration, the lower edge of the support inflation configuration portion may have only a single linear portion that inclines to the rear and downwards. The length of the linear portion 54a is preferably set in order for the linear portion 54a to extend to the rear further than at least the circumferential edge stitching portion 73 that is formed in the circumferential edge portion 25 of the gas inlet port 24. Furthermore, the rear end of the linear portion 54a may be disposed in the vicinity of an upper end (a hinge portion which is the rotational center of the open door portion 7b) of the case 13 when the airbag 16 is completely inflated.

In the airbag 16 of the embodiment, the inclined linear portion 54c is provided in each of the respective lower edges 54L and 54R of the support inflation configuration portions 53L and 53R so as to be positioned in rear of the curved portion 54b. For this reason, when the airbag 16 is completely inflated, it is possible to accurately align a portion in the vicinity of the lower end 29b of the support inflation portion 29 along the rear surface 3 of the instrument panel 1. Accordingly, it is possible to further prevent occurrence of a gap between the rear surface 3 of the instrument panel 1 and the airbag 16. This point being not taken into consideration, the lower edge of the support inflation configuration portion may not be provided with the inclined linear portion. However, the inclined linear portion 54c is preferably disposed in such a manner that the support inflation portion 29 is accurately aligned with the rear surface 3 of the instrument panel 1 to the lower end 29b when the airbag 16 is completely inflated.

Furthermore, in the airbag 16 of the embodiment, the inclined linear portion 54c is set to have an incline angle of 45° or greater (in the embodiment, an incline angle of 60°) with respect to the datum line CL1. It is possible to appropriately change the incline angle of the inclined linear portion based on the exterior shape of the instrument panel of the vehicle. However, in a case where the inclined linear portion is set to have a large incline angle with respect to the datum line, it is easy to align the support inflation portion even with the instrument panel of a different exterior shape when the airbag is completely inflated, and it is possible to install the airbag in instrument panels of different exterior shapes in various vehicles without a design change of the airbag.

Furthermore, in the airbag 16 of the embodiment, the longitudinal tether 37 is disposed inside the airbag 16. The longitudinal tether 37 connects the bottom portion (the front end 33a) of the concave portion 33 and the circumferential edge portion 25 of the gas inlet port 24, and pulls the front end 33a of the concave portion 33 to the front when the airbag 16 is completely inflated so that the longitudinal tether 37 regulates the shape of the completely inflated airbag 16. For this reason, at an initial stage of the inflation of the airbag 16, it is possible to prevent a portion (the occupant-side wall portion 32) in the vicinity of the front end 33a of the concave portion 33 from considerably protruding to the rear, and it is possible to prevent the inflating airbag 16 from considerably oscillating in the longitudinal direction. It is possible to quickly dispose the support inflation portion 29 along the rear surface 3 of the instrument panel 1.

Figure 19:
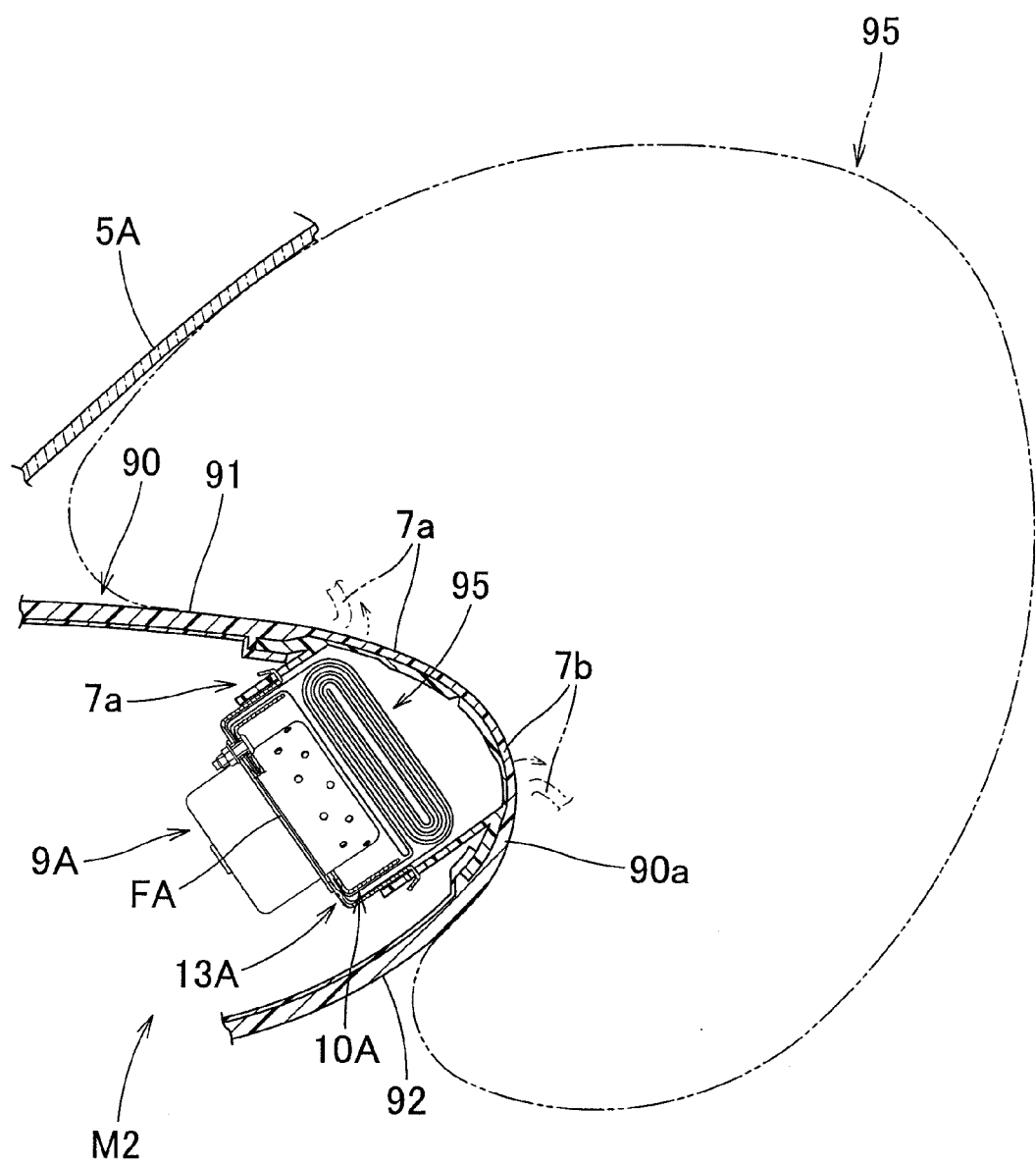
FIG. 19 is a longitudinal cross-sectional view illustrating a state where a front passenger seat airbag apparatus including a front passenger seat airbag according to a second embodiment of the present invention is installed in a vehicle.

Subsequently, an airbag 95 according to a second embodiment of the present invention will be described. As illustrated in FIG. 19, an airbag apparatus M2 including the airbag 95 of the second embodiment is installed in an instrument panel 90 that is set to have a vertical thickness dimension smaller than that of the instrument panel 1. The airbag apparatus M2 is installed in a rear end 90a of the instrument panel 90 in a state where the airbag apparatus M2 inclines in a longitudinal direction in such a manner that a rear side of the airbag apparatus M2 is positioned below further than that of the airbag apparatus M1, and an opening of a case 13A faces the rear.

The airbag apparatus M2 has the same configuration as that of the airbag apparatus M1 except for the airbag 95. For this reason, "A" is affixed to the end of the same reference sign assigned to the same member, and the detailed description will be omitted.

Figure 20:
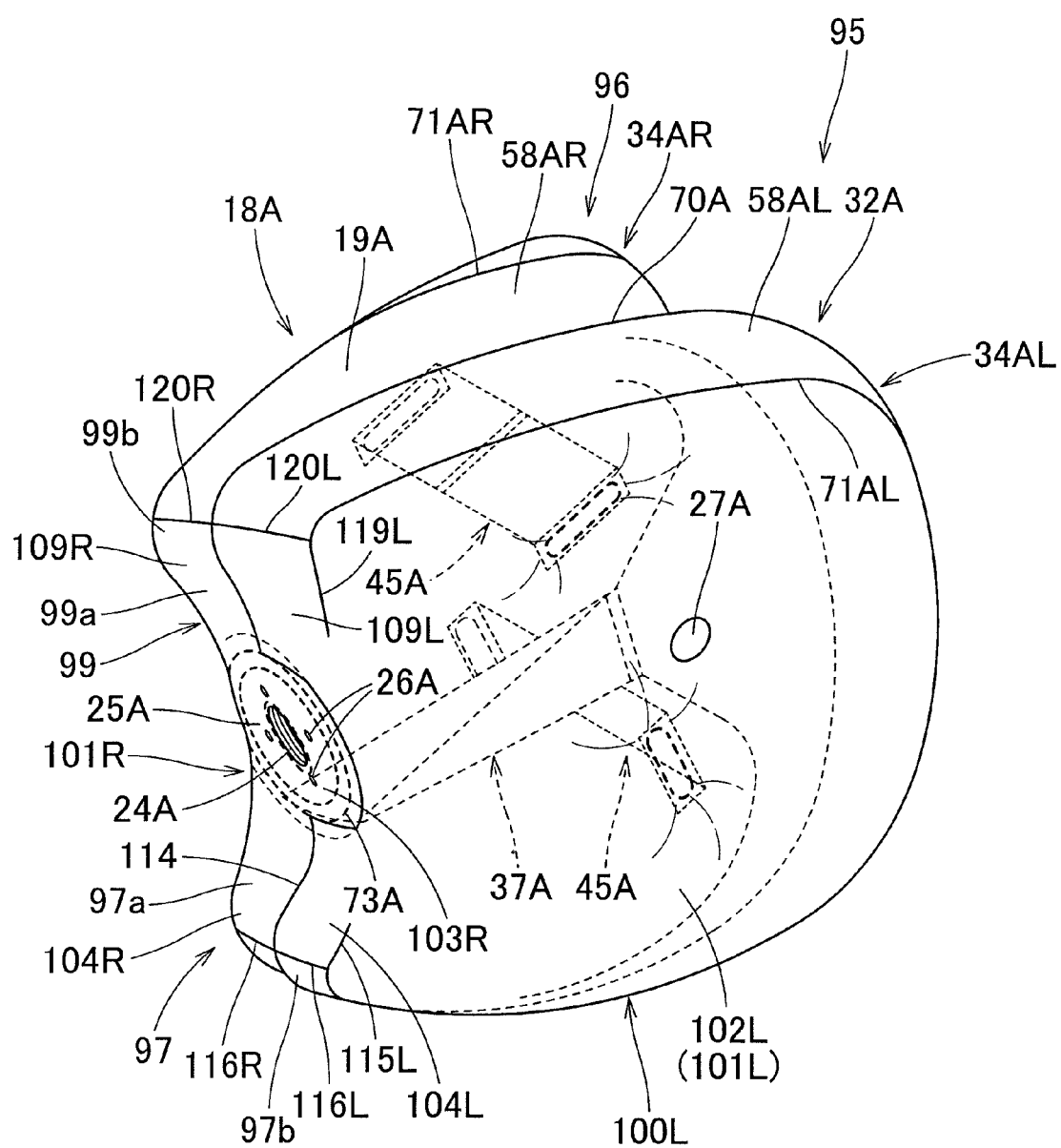
FIG. 20 is a perspective view illustrating a state where the airbag of the second embodiment is inflated solely.
Figure 21:
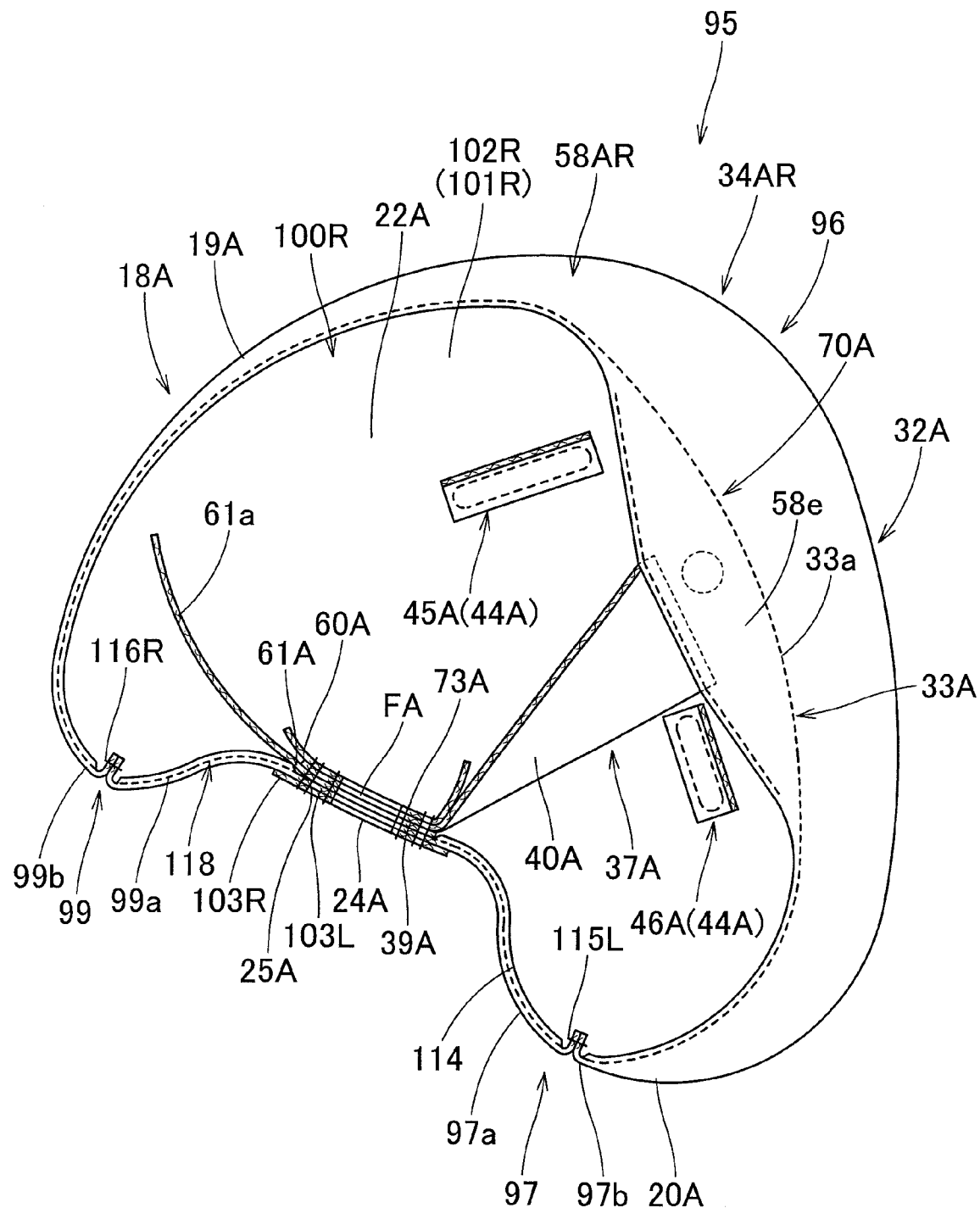
FIG. 21 is a schematic longitudinal cross-sectional view of the airbag in FIG. 20 along a longitudinal direction.

As illustrated in FIGS. 20 and 21, the airbag 95 includes an airbag main body 96; a longitudinal tether 37A that is disposed inside the airbag main body 96 so as to regulate the shape of the completely inflated airbag main body 96; and a lateral tether 44A. The longitudinal tether 37A has the same configuration as that of the longitudinal tether 37 of the airbag 16 except that the exterior shape of the longitudinal tether 37A is slightly different from that of the longitudinal tether 37. The lateral tether 44A has the same configuration as that of the lateral tether 44 of the airbag 16. For this reason, a reference sign of each of the longitudinal tether 37A and the lateral tether 44A is defined according to a rule that the "A" is affixed to the end of the same reference sign assigned to the same member, and the detailed description will be omitted.

Figure 24:
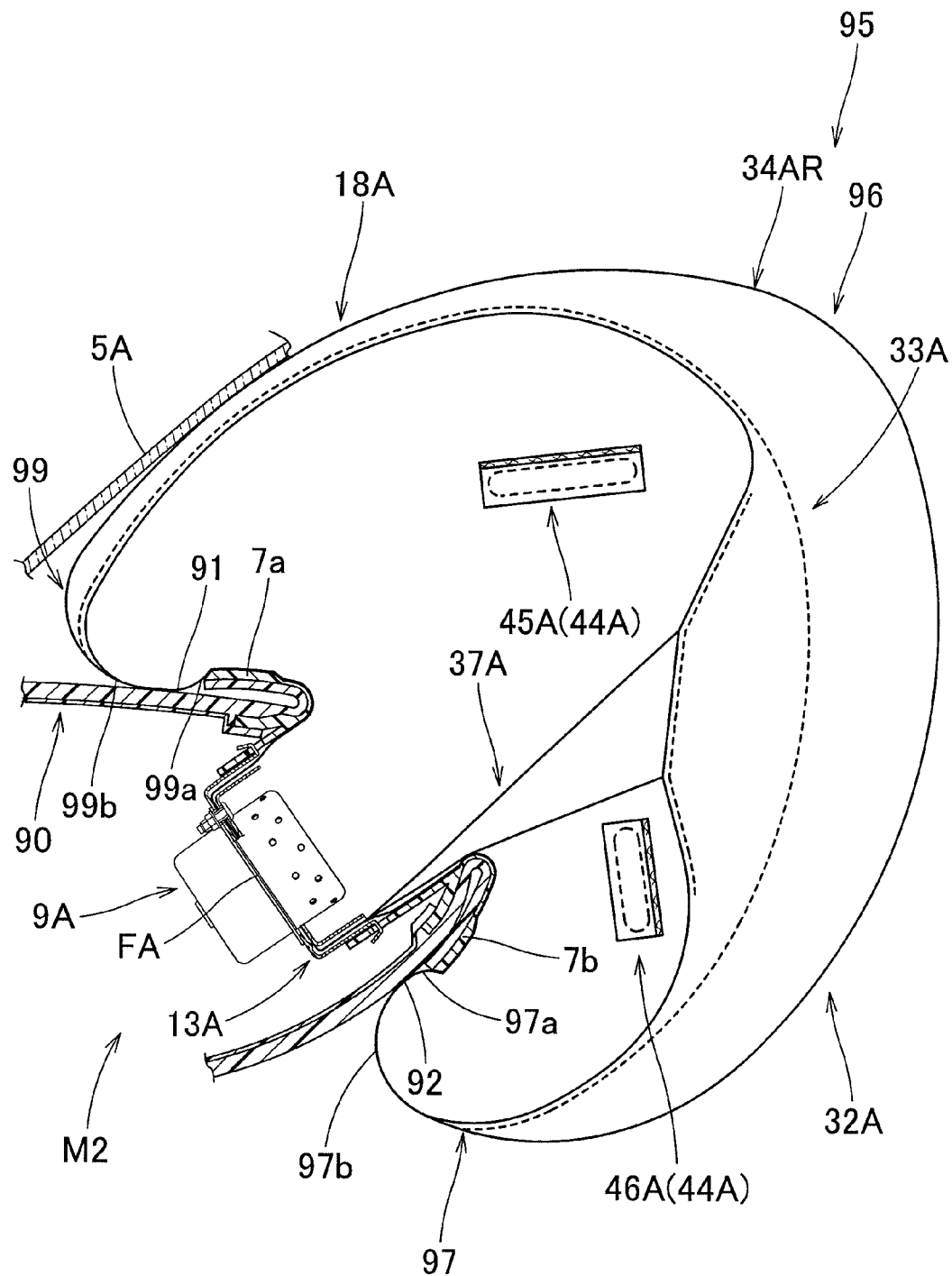
FIG. 24 is a schematic longitudinal cross-sectional view in the longitudinal direction illustrating a state where the airbag of the second embodiment is completely inflated in the front passenger seat airbag apparatus with the airbag.

In the second embodiment, as illustrated by the two-dot chain line in FIG. 19 and as illustrated in FIG. 24, when the airbag 95 is completely inflated, the airbag main body 96 is disposed so as to fill up a space between an upper surface 91 of the instrument panel 90 and a windshield 5A above the instrument panel 90, and to cover the rear end 90a of the instrument panel 90 to a lower surface. Specifically, the airbag main body 96 includes a rear support inflation portion 97 which is positioned on a rear side of a gas inlet port 24A when the airbag is completely inflated, and a front support inflation portion 99 which is positioned on a front side of the gas inlet port 24A when the airbag is completely inflated. The airbag main body 96 has substantially the same configuration as that of the bag main body 17 of the airbag 16 except for the rear support inflation portion 97 and the front support inflation portion 99. For this reason, "A" is affixed to the end of the same reference sign assigned to the same member, and the detailed description will be omitted.

Figure 22:
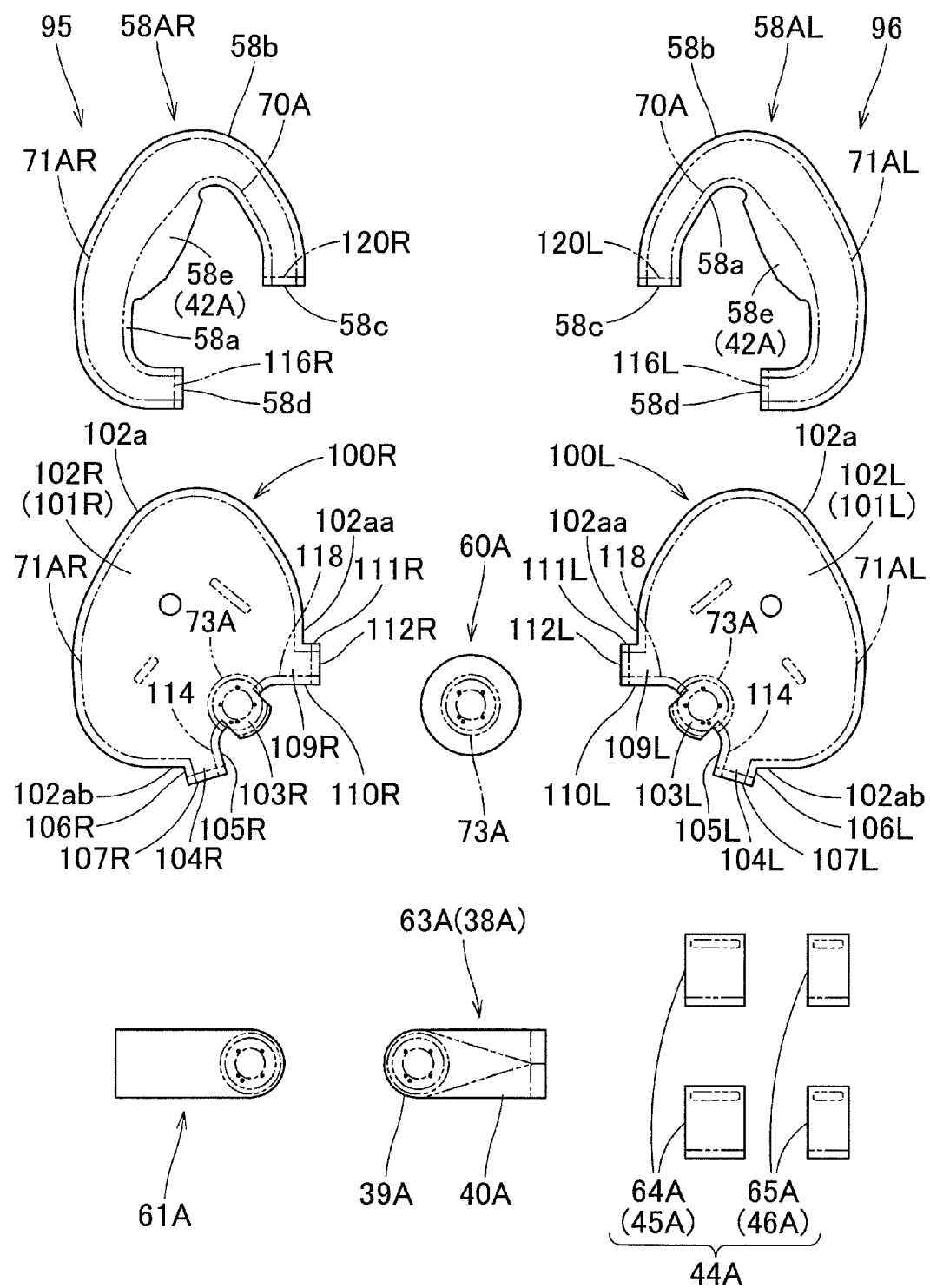
FIG. 22 illustrates plan views of basic fabrics of the airbag of the second embodiment.

Each basic fabric of the airbag 95 also has the same configuration as that of the airbag 16 except for an outer left panel 100L and an outer right panel 100R which will be described later. For this reason, "A" is affixed to the end of the same reference sign assigned to the same member, and the detailed description will be omitted. That is, as illustrated in FIG. 22, the airbag main body 96 is configured to have four sheets of basic fabrics: the outer left panel 100L and the outer right panel 100R which are disposed on outer sides in a lateral direction when the airbag main body 96 is completely inflated, and an inner left panel 58AL and an inner right panel 58AR which are disposed on inner sides in the lateral direction when the airbag main body 96 is completely inflated. The airbag main body 96 has a bag shape in which corresponding circumferential edges of the four basic fabrics are stitched together. In addition, the airbag main body 96 includes two sheets of reinforcement fabrics 60A and 61A for reinforcement of a circumferential edge portion 25A of the gas inlet port 24A.

Furthermore, in the airbag 95 of the second embodiment installed in a vehicle, when the airbag 95 is attached to the case 13A along with an inflator 9A, an opening plane FA of the gas inlet port 24A is disposed so as to further incline (an incline angle: approximately 60°) with respect to the horizontal plane compared to when the opening plane F of the gas inlet port 24 of the airbag 16 inclines with respect to the horizontal plane (refer to FIGS. 19 and 24).

As illustrated in FIGS. 20 and 21, the rear support inflation portion 97 is disposed in a portion of a lower wall portion 20A of a circumferential wall portion 18A, which is positioned on a rear side of the gas inlet port 24A. The rear support inflation portion 97 is disposed so as to protrude to the front and downwards when the airbag 95 is completely inflated. The rear support inflation portion 97 is in contact with a rear lower surface 92 of the instrument panel 90, which is positioned on a rear lower side of the case 13A, and is supported by the rear lower surface 92 of the instrument panel 90. As illustrated in FIG. 24, when the airbag 95 is installed in the vehicle, a front surface 97a of the rear support inflation portion 97 is in contact with substantially the entire rear lower surface 92 of the instrument panel 90. The rear support inflation portion 97 bends in such a manner that the front surface 97a of the rear support inflation portion 97 is aligned with the rear lower surface 92 of the instrument panel 90, and a lower end 97b of the rear support inflation portion 97 faces the front. The rear support inflation portion 97 also is set to have a lateral width dimension which is approximately one third of a lateral width dimension of the airbag main body 96 when the airbag is completely inflated. A center stitching portion 114 and end stitching portions 115L and 115R are formed in the rear support inflation portion 97. The center stitching portion 114 is formed by joining (stitching) together respective lower edges 105L and 105R of rear support inflation configuration portions 104L and 104R that are respectively formed in an outer left panel 100L and an outer right panel 100R which are two sheets of panels of the circumferential wall portion 18A. The end stitching portions 115L and 115R are formed by joining (stitching) rear upper edges (upper edges) 106L and 106R of the rear support inflation configuration portions 104L and 104R with front lower end portions 102ab in an outer circumferential edge 102a of an outer left panel main body 101L and an outer right panel main body 101R, respectively. The center stitching portion 114 continues from a lower end of an inner stitching portion 70A, and extends to the front. The inner stitching portion 70A forms a concave bottom portion (a front end 33a) of a concave portion 33A that is disposed at the center of an occupant-side wall portion 32A in the lateral direction. The center stitching portion 114 is disposed at substantially the center of the rear support inflation portion 97 in the lateral direction. The center stitching portion 114 is formed to the vicinity of the gas inlet port 24A over the entire rear support inflation portion 97 in a substantially longitudinal direction. A double circular circumferential edge stitching portion 73A is formed in the circumferential edge portion 25A of the gas inlet port 24A. Specifically, the center stitching portion 114 extends inwardly across the circumferential edge stitching portion 73A slightly further than the circumferential edge stitching portion 73A. The end stitching portions 115L and 115R are substantially in parallel with the center stitching portion 114. The end stitching portions 115L and 115R continue from lower ends of outer stitching portions 71AL and 71AR, respectively, and extend to the front. The outer stitching portions 71AL and 71AR form respective protruding apex portions 34a of protrusion portions 34AL and 34AR of the occupant-side wall portion 32A. The end stitching portions 115L and 115R are respectively formed in left and right regions in a rear end of the center stitching portion 114. Lateral stitching portions 116L and 116R are disposed in the rear end of the rear support inflation portion 97 along a substantially lateral direction. The lateral stitching portions 116L and 116R connect a rear end of the center stitching portion 114 and respective rear ends of the end stitching portions 115L and 115R. The lateral stitching portions 116L and 116R are formed by stitching rear lower edges (rear edges) 107L and 107R of the rear support inflation configuration portions 104L and 104R with front lower edges 58d of the inner left panel 58AL and the inner right panel 58AR, respectively.

As illustrated in FIGS. 20 and 21, the front support inflation portion 99 is disposed on a front side of the gas inlet port 24A so as to protrude to the front and downwards when the airbag 95 is completely inflated. The front support inflation portion 99 is in contact with an upper surface 91 of the instrument panel 90, which is positioned on the front side of the case 13A, and is supported by the upper surface 91 of the instrument panel 90. As illustrated in FIG. 24, when the airbag 95 is installed in the vehicle, a lower surface 99a of the front support inflation portion 99 is in contact with substantially the entire upper surface 91 of the instrument panel 90. The front support inflation portion 99 bends in such a manner that the lower surface 99a of the front support inflation portion 99 is aligned with the upper surface 91 of the instrument panel 90, and a front end 99b of the front support inflation portion 99 faces downwards. A lateral width dimension of the front support inflation portion 99 is substantially the same as a lateral width dimension of the rear support inflation portion 97. That is, the front support inflation portion 99 has the lateral width dimension which is approximately one third of the lateral width dimension of the airbag main body 96 when the airbag is completely inflated. A center stitching portion 118 and end stitching portions 119L and 119R are formed in the front support inflation portion 99. The center stitching portion 118 is formed by joining (stitching) together respective lower edges 110L and 110R of front support inflation configuration portions 109L and 109R that are respectively formed in the outer left panel 100L and the outer right panel 100R which are two sheets of panels of the circumferential wall portion 18A. The end stitching portions 119L and 119R are formed by joining (stitching) front upper edges (upper edges) 111L and 111R of the front support inflation configuration portions 109L and 109R with front upper end portions 102aa in the outer circumferential edge 102a of the outer left panel main body 101L and the outer right panel main body 101R, respectively. The center stitching portion 118 continues from an upper end of the inner stitching portion 70A, and extends to the front. The center stitching portion 118 is formed at substantially the center of the front support inflation portion 99 in the lateral direction. The center stitching portion 118 is formed to the vicinity of the gas inlet port 24A over the entire front support inflation portion 99 in a substantially longitudinal direction. Specifically, the center stitching portion 118 extends inwardly across the circumferential edge stitching portion 73A slightly further than the circumferential edge stitching portion 73A. The end stitching portions 119L and 119R are substantially in parallel with the center stitching portion 118. The end stitching portions 119L and 119R continue from upper ends of the outer stitching portions 71AL and 71AR, respectively, and extend to the front. The end stitching portions 119L and 119R are respectively formed in left and right regions in a front end of the center stitching portion 118. Lateral stitching portions 120L and 120R are disposed in the front end of the front support inflation portion 99 along a substantially lateral direction. The lateral stitching portions 120L and 120R connect a front end of the center stitching portion 118 and respective front ends of the end stitching portions 119L and 119R. The lateral stitching portions 120L and 120R are formed by stitching front lower edges (front edges) 112L and 112R of the front support inflation configuration portions 109L and 109R with front upper edges 58c of the inner left panel 58AL and the inner right panel 58AR, respectively.

Figure 23:
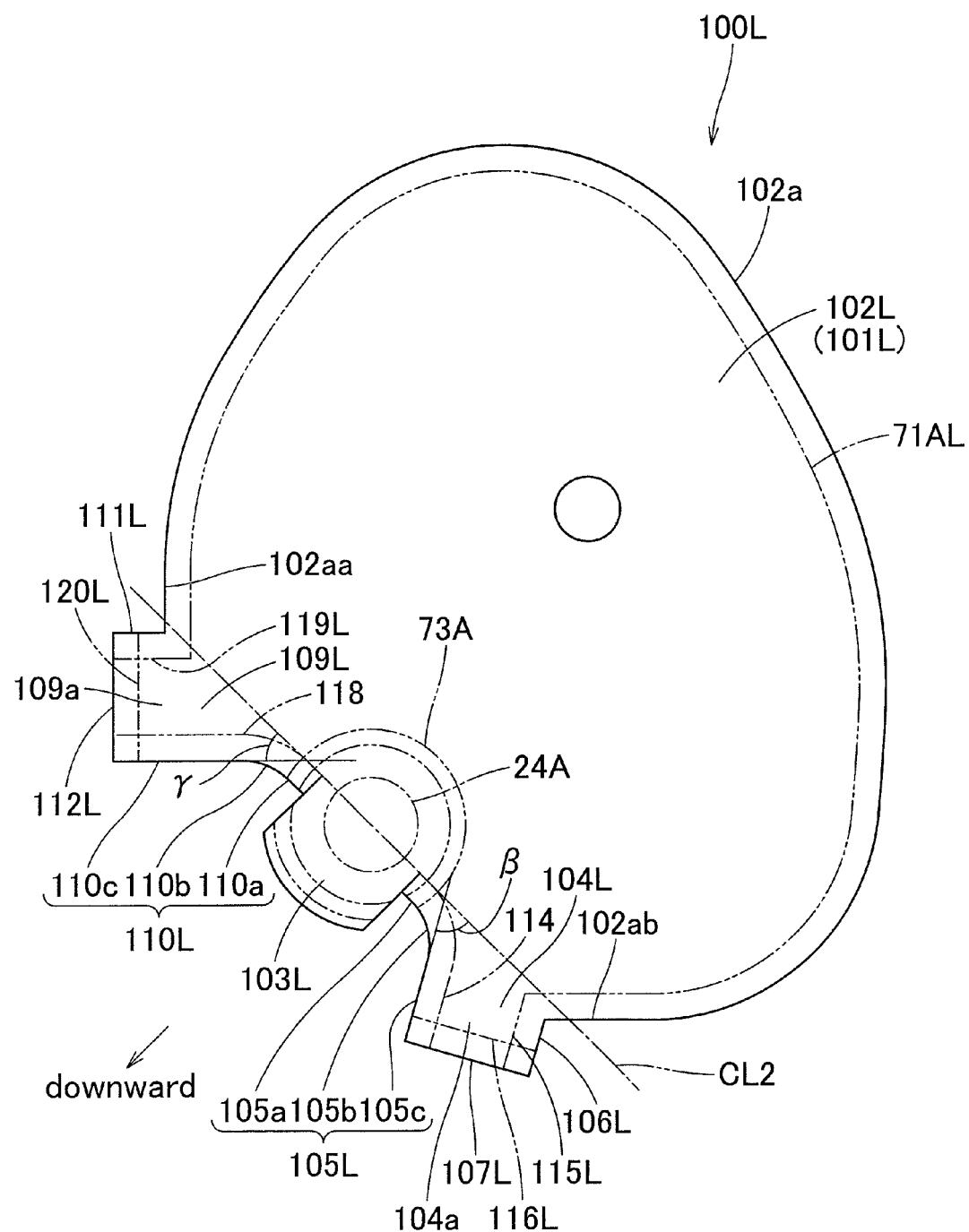
FIG. 23 is a plan view of an outer left panel of the airbag of the second embodiment.

As illustrated in FIG. 23, the outer left panel 100L includes an outer left panel main body 101L; an inlet port configuration portion 103L; the rear support inflation configuration portion 104L; and the front support inflation configuration portion 109L. Since the inlet port configuration portion 103L forms the circumferential edge portion 25A of the gas inlet port 24A, the inlet port configuration portion 103L is positioned at the center of a lower edge of the outer left panel main body 101L. Since the rear support inflation configuration portion 104L forms the rear support inflation portion 97, the rear support inflation configuration portion 104L is positioned in a rear portion at the lower edge of the outer left panel main body 101L. Since the front support inflation configuration portion 109L forms the front support inflation portion 99, the front support inflation configuration portion 109L is positioned in a front portion at the lower edge of the outer left panel main body 101L. The outer left panel main body 101L includes a center portion 102L forming a left wall portion 21A. The inlet port configuration portion 103L is disposed below the center portion 102L. The rear support inflation configuration portion 104L is disposed in back of the inlet port configuration portion 103L. The front support inflation configuration portion 109L is disposed in front of the inlet port configuration portion 103L. The center portion 102L has a substantially elliptical exterior shape. In an bag main body 17A of the embodiment, the center portion 102L forms the entire left wall portion 21A of the circumferential wall portion 18A, and a region on the left of the protruding apex portion 34a of the protrusion portion 34AL of the occupant-side wall portion 32A. The inlet port configuration portion 103L forms a front region of the lower wall portion 20A, which is the circumferential edge portion 25A of the gas inlet port 24A. The inlet port configuration portion 103L protrudes in a substantially semielliptic shape from the center portion 102L so as to overlap an inlet port configuration portion 103R formed in the outer right panel 100R.

When the outer left panel 100L is flatly deployed in a state where a vertical direction of the outer left panel 100L coincides with the vertical direction of the completely inflated airbag 95, the rear support inflation configuration portion 104L is adjacent to the rear of the inlet port configuration portion 103L. The rear support inflation configuration portion 104L is disposed in such a manner that the rear support inflation configuration portion 104L extends to the rear from the inlet port configuration portion 103L, and a rear end 104a of the rear support inflation configuration portion 104L is separated from the center portion 102L of the outer left panel main body 101L. The rear support inflation configuration portion 104L is disposed in such a manner that the rear support inflation configuration portion 104L inclines to protrude to the rear and downwards, and has a substantially belt-like shape. In the rear support inflation configuration portion 104L of the embodiment, a lower edge 105L is configured to have a linear portion 105a which is a portion of the lower edge 105L positioned toward the inlet port configuration portion 103L (on a front side); an inclined linear portion 105c which is positioned in a distal end (rear end) portion of the lower edge 105L; and a curved portion 105b which is positioned in a middle portion of the lower edge 105L in the longitudinal direction (refer to FIG. 23). The linear portion 105a extends to the rear from the inlet port configuration portion 103L along a datum line CL2. The inclined linear portion 105c inclines to the rear and downwards with respect to the datum line CL2. The curved portion 105b bends to the rear and downwards from the linear portion 105a so as to smoothly connect the linear portion 105a and the inclined linear portion 105c. The datum line CL2 is a line obtained by projecting a center extension line on the flatly deployed outer left panel 100L. The center extension line is a line obtained by extending a center line that is disposed along the longitudinal direction so as to pass through the opening plane and the center of the gas inlet port 24A at the installation of the airbag in the vehicle. That is, the lower edge 105L includes the linear portion 105a, the curved portion 105b, and the inclined linear portion 105c. In the second embodiment, the inclined linear portion 105c is set to have an incline angle 3 of approximately 60° with respect to the datum line CL2 (refer to FIG. 23). In the rear support inflation configuration portion 104L (the rear support inflation portion 97), a portion in the vicinity of the linear portion 105a is disposed inside the case 13A when the airbag 95 is completely inflated. In the second embodiment, the linear portion 105a is formed in the circumferential edge stitching portion 73A disposed in the circumferential edge portion 25A of the gas inlet port 24A.

A rear upper edge (an upper edge) 106L of the rear support inflation configuration portion 104L is separated from the outer circumferential edge 102a of the center portion 102L at the rear end 104a of the rear support inflation configuration portion 104L. The rear upper edge (the upper edge) 106L is substantially parallel with the inclined linear portion 105c of the lower edge 105L. The rear lower edge (the rear edge) 107L of the rear support inflation configuration portion 104L corresponds to the front lower edge 58d of the inner left panel 58AL. In the embodiment, the rear lower edge (the lower edge) 107L is substantially orthogonal to the inclined linear portion 105c of the lower edge 105L and the rear upper edge 106L. Furthermore, when the outer left panel 100L is flatly deployed, the lower edge 105L and the rear upper edge 106L of the rear support inflation configuration portion 104L protrude downwards further than the datum line CL2. In the second embodiment, the linear portion 105a of the lower edge 105L is positioned on the datum line CL2. The curved portion 105b and the inclined linear portion 105c of the lower edge 105L and the rear upper edge 106L are disposed so as to be positioned below the datum line CL2. The rear support inflation configuration portion 104L has substantially the same width dimension as an inner diameter dimension of the gas inlet port 24A.

When the outer left panel 100L is flatly deployed in a state where a vertical direction of the outer left panel 100L coincides with the vertical direction of the completely inflated airbag 95, the front support inflation configuration portion 109L is adjacent to the front of the inlet port configuration portion 103L. The front support inflation configuration portion 109L extends to the front from the inlet port configuration portion 103L, and a front end 109a of the front support inflation configuration portion 109L is separated from the center portion 102L of the outer left panel main body 101L. The front support inflation configuration portion 109L is disposed in such a manner that the front support inflation configuration portion 109L inclines to protrude to the front and downwards, and has a substantially belt-like shape. The front support inflation configuration portion 109L is substantially symmetrical in the longitudinal direction with the rear support inflation configuration portion 104L and the gas inlet port 24A as the center. In the front support inflation configuration portion 109L of the embodiment, a lower edge 110L is configured to have a linear portion 110a which is a portion of the lower edge 110L positioned toward the inlet port configuration portion 103L (on a rear side); an inclined linear portion 110c which is positioned in a distal end (front end) portion of the lower edge 110L; and a curved portion 110b which is positioned in a middle portion of the lower edge 110L in the longitudinal direction (refer to FIG. 23). The linear portion 110a extends to the front from the inlet port configuration portion 103L along a datum line CL2. The inclined linear portion 110c inclines to the front and downwards with respect to the datum line CL2. The curved portion 110b bends to the front and downwards from the linear portion 110a so as to smoothly connect the linear portion 110a and the inclined linear portion 110c. That is, the lower edge 110L includes the linear portion 110a, the curved portion 110b, and the inclined linear portion 110c. In the second embodiment, the inclined linear portion 110c is set to have an incline angle γ of approximately 45° with respect to the datum line CL2 (refer to FIG. 23). In the front support inflation configuration portion 109L (the front support inflation portion 99), a portion in the vicinity of the linear portion 110a is disposed inside the case 13A when the airbag 95 is completely inflated. Similar to the linear portion 105a of the lower edge 105L of the rear support inflation configuration portion 104L, the linear portion 110a is formed in the circumferential edge stitching portion 73A disposed in the circumferential edge portion 25A of the gas inlet port 24A.

A front upper edge (an upper edge) 111L of the front support inflation configuration portion 109L is separated from the outer circumferential edge 102a of the center portion 102L at the front end 109a of the front support inflation configuration portion 109L. The front upper edge (the upper edge) 111L is substantially parallel with the inclined linear portion 110c of the lower edge 110L. The front lower edge (the lower edge) 112L of the front support inflation configuration portion 109L corresponds to the front upper edge 58c of the inner left panel 58AL. In the embodiment, the front lower edge (the lower edge) 112L is substantially orthogonal to the inclined linear portion 110c of the lower edge 110L and the front upper edge 111L. Furthermore, when the outer left panel 100L is flatly deployed, the lower edge 110L and the front upper edge 111L of the front support inflation configuration portion 109L protrude downwards further than the datum line CL2. In the second embodiment, the linear portion 110a of the lower edge 110L is positioned on the datum line CL2. The curved portion 110b and the inclined linear portion 110c of the lower edge 110L and the front upper edge 111L are disposed so as to be positioned below the datum line CL2. In the embodiment, the front support inflation configuration portion 109L has substantially the same width dimension as a width dimension of the rear support inflation configuration portion 104L. That is, the front support inflation configuration portion 109L has substantially the same width dimension as an inner diameter dimension of the gas inlet port 24A. According to a stitching margin illustrated even in FIG. 23, the linear portions 105a and 110a are positioned to be shifted downwards further than the datum line CL2. However, in practicality, the linear portions 105a and 110a are disposed so as to substantially coincide with the datum line CL2 in the outer left panel 100L. As illustrated in FIG. 22, since the configuration of the outer right panel 100R is bilaterally symmetrical with that of the outer left panel 100L, the detailed description of the outer right panel 100R will be omitted.

Even when the airbag 95 with this configuration is used, the rear support inflation portion 97 is formed on a portion of the airbag 95, which is positioned on the rear side of the gas inlet port 24A when the airbag 95 is completely inflated, so as to protrude downwards. When the airbag 95 is completely inflated, the rear support inflation portion 97 is in contact with the rear lower surface 92 of the instrument panel 90, which is positioned on a rear side of an accommodating portion (the case 13A), and is supported by the instrument panel 90. In the second embodiment, the front support inflation portion 99 is formed on a portion of the airbag 95, which is positioned on the front side of the gas inlet port 24A when the airbag 95 is completely inflated, so as to protrude to the front and downwards. When the airbag 95 is completely inflated, the front support inflation portion 99 is in contact with the upper surface 91 of the instrument panel 90, which is positioned on the front side of the case 13A, and is supported by the instrument panel 90. The front support inflation portion 99 also is in wide surface contact with the upper surface 91 in the lateral direction, which is positioned on the front side of the case 13A of the instrument panel 90. Similar to the support inflation portion 29 of the airbag 16, the front support inflation portion 99 is disposed so as to incline to the front and downwards, and to considerably protrude from the opening plane FA of the gas inlet port 24A when the airbag 95 is completely inflated (refer to FIG. 24). In addition, the rear support inflation portion 97 is disposed so as to incline to the rear and downwards, and to considerably protrude from the opening plane FA of the gas inlet port 24A when the airbag 95 is completely inflated (refer FIG. 24). Furthermore, similar to the support inflation portion 29 of the airbag 16, three joining portions (the center stitching portion 114 and 118, the two end stitching portions 115L and 115R, and the two end stitching portions 119L and 119R) are disposed along a substantially longitudinal direction, and are provided in parallel with each other in the lateral direction in the considerably protruding respective front and rear regions (regions that are separated from the gas inlet port 24A) of the front support inflation portion 99 and the rear support inflation portion 97. In the rear support inflation portion 97, the lateral stitching portions 116L and 116R connect the rear end of the center stitching portion 114 and the respective rear ends of the end stitching portions 115L and 115R, respectively. The lateral stitching portion 116L is formed by joining together the rear lower edge (the rear edge) 107L of the rear support inflation configuration portions 104L and the front lower edge 58d of the inner left panel 58AL. The lateral stitching portion 116R is formed by joining together the rear lower edge (the rear edge) 107R of the rear support inflation configuration portion 104R and the front lower edge 58d of the inner right panel 58AR. In the front support inflation portion 99, the lateral stitching portions 120L and 120R connect the front end of the center stitching portion 118 and the respective front ends of the end stitching portions 119L and 119R, respectively. The lateral stitching portion 120L is formed by joining together the front lower edge (the front edge) 112L of the front support inflation configuration portions 109L and the front upper edge 58c of the inner left panel 58AL. The lateral stitching portion 120R is formed by joining together the front lower edge (the front edge) 112R of the front support inflation configuration portion 109R and the front upper edge 58c of the inner right panel 58AR. For this reason, even in the airbag 95 of the second embodiment, it is possible to stably maintain a state where the considerably protruding rear portion of the rear support inflation portion 97 is in wide surface contact with the rear lower surface 92 of the instrument panel 90 in the lateral direction using the center stitching portion 114 which is disposed at the center of the rear support inflation portion 97 in the lateral direction; the end stitching portions 115L and 115R which are disposed on the right and the left sides of the center stitching portion 114; and the lateral stitching portions 116L and 116R which are disposed so as to respectively connect the center stitching portion 114 and the end stitching portions 115L and 115R. It is possible to stably maintain a state where a considerably protruding front portion of the front support inflation portion 99 is in wide surface contact with the upper surface 91 of the instrument panel 90 in the lateral direction using the center stitching portion 118 which is disposed at the center of the front support inflation portion 99 in the lateral direction; the end stitching portions 119L and 119R which are disposed on the right and the left sides of the center stitching portion 118; and the lateral stitching portions 120L and 120R which are disposed so as to respectively connect the center stitching portion 118 and the end stitching portions 119L and 119R.

As a result, in the airbag 95 of the second embodiment, it is possible to further prevent occurrence of a gap between the instrument panel 90 and the airbag 95 when the airbag 95 is completely inflated. The reason is because the airbag 95 includes the front support inflation portion 99 in contact with the upper surface 91 of the instrument panel 90, which is positioned on the front side of the case 13A in addition to the rear support inflation portion 97 in contact with the rear lower surface 92 of the instrument panel 90, which is positioned on the rear side of the case 13A. In the airbag 95 of the second embodiment, the front support inflation portion 99 and the rear support inflation portion 97 can support the completely inflated airbag 95 on the front and the rear sides of the case 13A. For this reason, in the second embodiment, even when the slim instrument panel 90 has a small vertical thickness dimension, the instrument panel 90 can more stably support the airbag 95.

Even in the airbag 95 of the second embodiment, the outer left panel 100L and the outer right panel 100R are substantially symmetrical with each other. For this reason, it is possible to three-dimensionally form the front support inflation portion 99 and the rear support inflation portion 97 with partial protrusion portions using a two-dimensional joining operation, and it is possible to easily manufacture the airbag 95.

What is claimed is:

1. A front passenger seat airbag that is accommodated in an instrument panel in front of a front passenger seat of a vehicle, comprising:
    a gas inlet port that is provided at substantially the lateral center of a lower surface in the vicinity of a front end when the airbag is completely inflated;
    a concave portion that is disposed toward an occupant so as to be concave toward the front when the airbag is completely inflated;
    two protrusion portions that are disposed on left and right sides of the concave portion so as to protrude to the rear, and
    a support inflation portion that protrudes downwards from a portion of the airbag, which is positioned on a rear side of the gas inlet port, that is in contact with a region of the instrument panel, which is positioned on a rear side of an accommodating portion when the airbag is completely inflated, and that is supported by the instrument panel,
    wherein the airbag has a bag shape in which circumferential edges of outer left and right panels that are disposed on outer sides in a lateral direction when the airbag is completely inflated are joined with circumferential edges of inner left and right panels that are disposed on an inner side in the lateral direction when the airbag is completely inflated, respectively,
    wherein the inner left and the inner right panels are a pair of left and right panels, each of which bends so as to form a substantially C shape,
    wherein a protruding apex portion of each of the protruding portions is formed of each of left and right outer joining portions that are formed by joining the outer circumferential edges of the outer left and the outer right panels with the outer circumferential edges of the inner left and the inner right panels, respectively,
    wherein a bottom portion of the concave portion is formed of an inner joining portion that is formed by joining together respective inner circumferential edges of the inner left and the inner right panels,
    wherein when each of the inner left and the inner right panels is flatly deployed in a state where a vertical direction of each of the inner left and the inner right panels coincides with a vertical direction of the completely inflated airbag, each of the inner left and the inner right panels includes a front lower edge, which intersects the inner circumferential edge and the outer circumferential edge at a front lower end,
    wherein the outer left and the outer right panels include respective outer left and right panel main bodies; respective inlet port configuration portions that are positioned in front portions at lower edges of the outer left panel and the outer right panel main bodies, and form circumferential edges of the gas inlet port; and support inflation configuration portions that are respectively positioned in rear portions at the lower edges of the outer left panel and the outer right panel main bodies so as to form the support inflation portions,
    wherein the outer left and the outer right panels are substantially symmetrical with each other in at least the support inflation configuration portions,
    wherein the support inflation configuration portion has a substantially belt-like shape in which when the outer left and the outer right panels are flatly deployed in a state where a vertical direction of the each of the outer left panel and the outer right panel coincides with the vertical direction of the completely inflated airbag, the support inflation configuration portion is adjacent to the rear of the inlet port configuration portion, and the support inflation configuration portion is inclinedly disposed in such a manner that the support inflation configuration portion extends to the rear from the inlet port configuration portion, and a rear end of the support inflation configuration portion is separated from each of the outer left panel and the outer right panel main bodies,
    wherein the lower edge of the support inflation configuration portion and an upper edge, which is separated from the outer circumferential edge of each of the outer left panel and the outer right panel main bodies at the rear end of the support inflation configuration portion, are disposed so as to protrude downwards further than a datum line which is obtained by projecting a center extension line, which is obtained by extending a center line that is disposed along the longitudinal direction so as to pass through an opening plane and the center of the gas inlet port at the installation of the airbag in a vehicle, on each of the outer left and the outer right panels which are flatly deployed, and
    wherein the support inflation portion is formed by joining together the respective lower edges of the support inflation configuration portions, by joining the respective upper edges of the support inflation configuration portions with portions of the corresponding outer circumferential edges of the outer left panel and the outer right panel main bodies, which are positioned in front of the respective outer joining portions, and by respectively joining the rear edges, each of which intersects the lower edge and the upper edge at the rear end of the support inflation configuration portion, with the corresponding front lower edges of the inner left and the inner right panels.

2. The front passenger seat airbag according to claim 1, wherein the lower edge of the support inflation configuration portion includes a linear portion that is disposed on a front side and is positioned on the datum line, and a curved portion that bends to the rear and downwards from the linear portion.

3. The front passenger seat airbag according to claim 2, wherein the lower edge includes an inclined linear portion that extends from the curved portion, and inclines with respect to the datum line.

4. The front passenger seat airbag according to claim 3, wherein the inclined linear portion is set to have an incline angle of 45° or greater with respect to the datum line.

5. The front passenger seat airbag according to claim 1, wherein the airbag further includes a front support inflation portion that protrudes downwards from a portion of the airbag, which is positioned on a front side of the gas inlet port when the airbag is completely inflated, that is in contact with a region of the instrument panel, which is positioned on a front side of the accommodating portion, and that is supported by the instrument panel, wherein each of the inner left and the inner right panels includes a front upper edge that intersects the inner circumferential edge and the outer circumferential edge at a front upper edge of each of the inner left and the inner right panels which are flatly deployed, wherein the outer left and the outer right panels include respective front support inflation configuration portions that are disposed adjacent to the front side of the gas inlet port, that are substantially symmetrical with each other, and that form the front support inflation portions, wherein each of the front support inflation configuration portions has a substantially belt-like shape in which the front support inflation configuration portions are substantially symmetrical in the longitudinal direction with each other with the respective support inflation configuration portions of the rear support inflation portions and the gas inlet port as the center, the front support inflation configuration portions extend to the front from the respective gas inlet port configuration portions, and front ends of the front support inflation configuration portions are respectively separated from the outer left panel and the outer right panel main bodies, wherein a lower edge of the front support inflation configuration portion and an upper edge, which is separated from the outer circumferential edge of each of the outer left panel and the outer right panel main bodies at the front end of the front support inflation configuration portion, are disposed so as to protrude downwards further than the datum line, and wherein the front support inflation portion is formed by joining together the respective lower edges of the front support inflation configuration portions, by joining the respective upper edges of the front support inflation configuration portions with portions of the corresponding outer circumferential edges of the outer left panel and the outer right panel main bodies, which are positioned in front of the respective outer joining portions, and by respectively joining front edges, each of which intersects the lower edge and the upper edge at the front end of the front support inflation configuration portion, with the corresponding front upper edges of the inner left and the inner right panels.

6. The front passenger seat airbag according to claim 1, wherein the airbag further includes a longitudinal tether therein, which connects the bottom portion of the concave portion and the circumferential edge portion of the gas inlet port, and pulls the bottom portion of the concave portion to the front when the airbag is completely inflated so that the longitudinal tether regulates the shape of the completely inflated airbag.

\* \* \* \* \*